United States Patent
Inada

(10) Patent No.: US 10,521,706 B2
(45) Date of Patent: Dec. 31, 2019

(54) COLOR VERIFICATION APPARATUS, COLOR VERIFICATION SYSTEM, AND COMPUTER-READABLE STORAGE MEDIUM STORING A PROGRAM

(71) Applicant: KONICA MINOLTA, INC., Tokyo (JP)

(72) Inventor: Ryohei Inada, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/213,171

(22) Filed: Dec. 7, 2018

(65) Prior Publication Data

US 2019/0197372 A1 Jun. 27, 2019

(30) Foreign Application Priority Data

Dec. 22, 2017 (JP) ................... 2017-245820

(51) Int. Cl.
*H04N 1/60* (2006.01)
*G06K 15/02* (2006.01)

(52) U.S. Cl.
CPC ....... *G06K 15/1823* (2013.01); *H04N 1/6008* (2013.01); *H04N 1/6033* (2013.01)

(58) Field of Classification Search
CPC ...... G06F 3/1208; G06F 3/1244; G06F 3/126; G06F 3/1272; G06F 3/1285; G06F 3/1287; G06F 3/1204; G06F 3/1205; G06F 3/1267; G06F 3/1288; H04N 1/00023; H04N 1/6033; H04N 2201/0082; H04N 1/00034; H04N 1/00039; H04N 1/00082; H04N 1/40006; H04N 1/58; H04N 1/6027; H04N 1/6036; H04N 1/00031; H04N 1/00045; H04N 1/00047; H04N 1/00087; H04N 1/00588; H04N 1/0283; H04N 2201/0005; G01J 3/02; G01J 3/0208; G01J 3/027; G01J 3/0291; G01J 3/501; G01J 3/52;
(Continued)

(56) References Cited

U.S. PATENT DOCUMENTS 9,940,074 B1 * 4/2018 Soriano ................. G06F 3/1208
10,042,592 B1 * 8/2018 Soriano ................. G06F 3/126
(Continued)

FOREIGN PATENT DOCUMENTS

JP 2010-203825 A 9/2010

*Primary Examiner* — Negussie Worku
(74) *Attorney, Agent, or Firm* — Buchanan Ingersoll & Rooney PC

(57) ABSTRACT

A color verification apparatus according to an embodiment of the present invention uses a color measuring instrument to measure an estimation object in a printed matter including a RIP image formed by an image forming apparatus and thereby acquires a measured color value of the estimation object. The color verification apparatus calculates an estimated color value of a color verification target object from the measured color value of the estimation object and a conversion coefficient. The color verification apparatus performs color verification on the color verification target object in the printed matter based on the estimated color value of the color verification target object and a theoretical color value of the color verification target object when it is determined that color measurement is unavailable to the color verification target object.

19 Claims, 16 Drawing Sheets

(58) Field of Classification Search
CPC . G01J 3/524; G06K 15/1813; G06K 15/1878; G06T 2207/10008; G06T 2207/20064; G06T 2207/30176; G06T 7/12; G03G 15/0848; G03G 15/087; G03G 15/0887; G03G 15/2028
USPC ...... 358/1.9, 518, 504, 515, 520; 356/243.5, 356/402, 425, 72; 382/162, 167, 266; 399/72; 702/85
See application file for complete search history.

(56) References Cited

U.S. PATENT DOCUMENTS

| | | | |
|---|---|---|---|
| 2006/0072128 A1* | 4/2006 | Ng | H04N 1/58 358/1.9 |
| 2009/0190126 A1* | 7/2009 | Martinez | G01J 3/02 356/243.5 |
| 2014/0355016 A1* | 12/2014 | Kondo | G06K 15/1878 358/1.9 |
| 2015/0110400 A1* | 4/2015 | Vilpponen | H04N 5/2257 382/167 |
| 2016/0239728 A1* | 8/2016 | Suzuki | H04N 1/00034 |
| 2016/0352976 A1* | 12/2016 | Kuroiwa | H04N 1/6027 |
| 2018/0359380 A1* | 12/2018 | Itagaki | G03G 15/087 |
| 2019/0197372 A1* | 6/2019 | Inada | H04N 1/6033 |

* cited by examiner

FIG. 7A
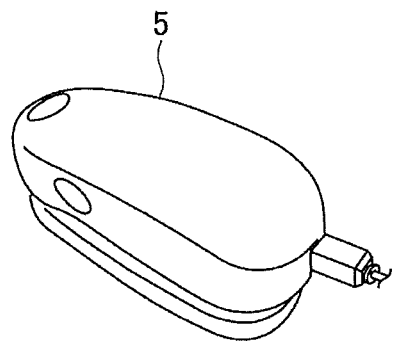
FIG. 7B
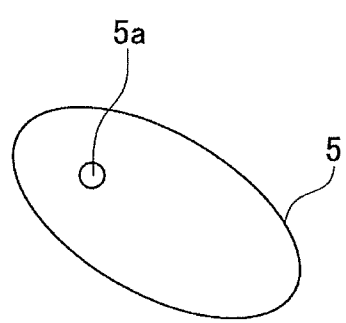
FIG. 8
CP
| Cyan | Magenta | Yellow | Black | L* | a* | b* |
|------|---------|--------|-------|-----|-----|-----|
| 0%   | 0%      | 0%     | 0%    | 100 | 0   | 0   |
| ...  |         |        |       | ... |     |     |
| 100% | 100%    | 100%   | 100%  | 0   | 0   | 0   |

FIG. 10
SELECTING JOB TO PERFORM COLOR VERIFICATION
SELECT A JOB TO PERFORM COLOR VERIFICATION FROM THE LIST.
A RIP IMAGE AND A COLOR PROFILE USED FOR COLOR
VERIFICATION WILL BE AUTOMATICALLY ACQUIRED.
| NAME: | CREATED DATE AND TIME: |
|---|---|
| Print Job 001 | 2017-10-22 11:23 |
| Print Job 002 | 2017-10-23 10:53 |
| Print Job 003 | 2017-10-23 11:03 |
| Print Job 004 | 2017-10-23 11:13 |
| Print Job 005 | 2017-10-23 11:33 |
[ OK ]  [ CANCEL ]
FIG. 11
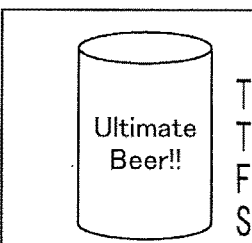
FIG. 12

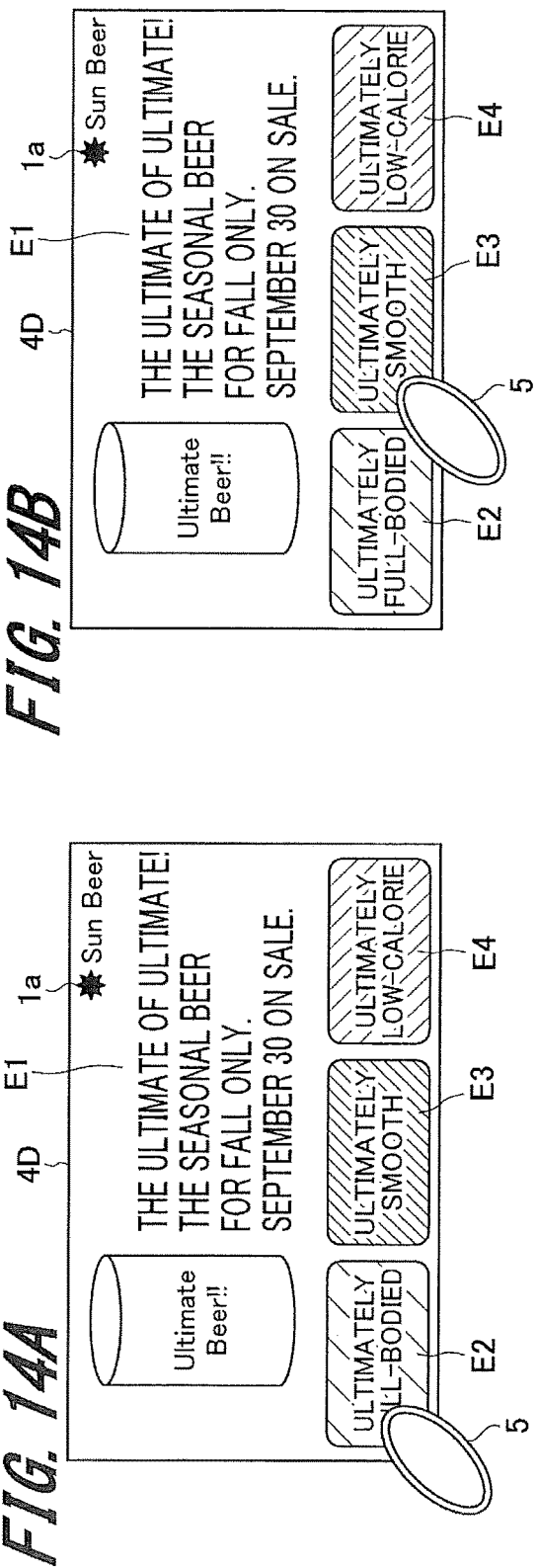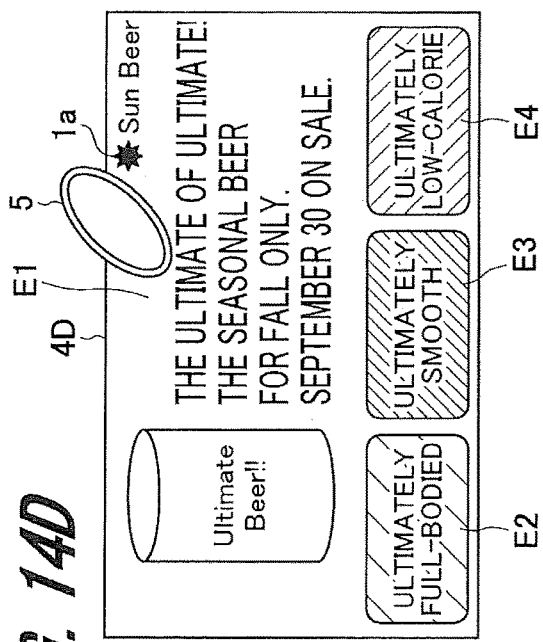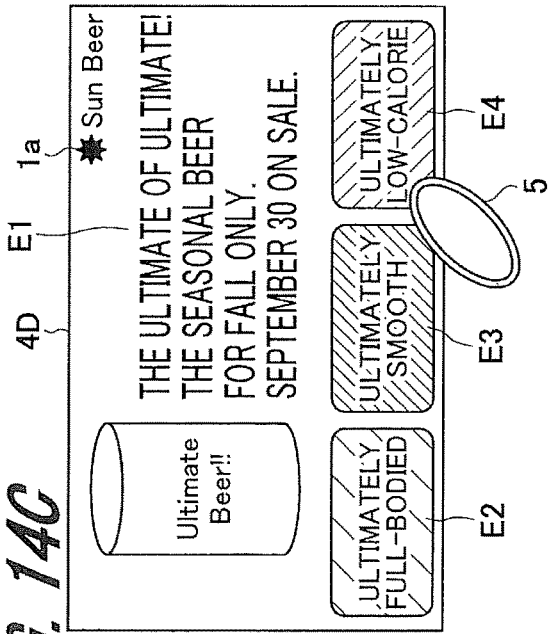

FIG. 15

COLOR VERIFICATION RESULT

CONFIRM THE COLOR VERIFICATION RESULT.

| | L* | a* | b* |
|---|---|---|---|
| TARGET VALUE | 56.0 | 73.0 | 68.0 |
| ESTIMATION VALUE | 55.1 | 71.5 | 65.2 |
| ERROR | ΔE 3.3 | | |

Sun Beer

Ultimate Beer!!

THE ULTIMATE OF ULTIMATE!
THE SEASONAL BEER
FOR FALL ONLY.
SEPTEMBER 30 ON SALE.

ULTIMATELY FULL-BODIED  ULTIMATELY SMOOTH  ULTIMATELY LOW-CALORIE

OK

COLOR VERIFICATION APPARATUS, COLOR VERIFICATION SYSTEM, AND COMPUTER-READABLE STORAGE MEDIUM STORING A PROGRAM

CROSS-REFERENCE TO RELATED APPLICATIONS

The entire disclosure of Japanese Patent Application No. 2017-245820, filed on Dec. 22, 2017, is incorporated herein by reference in its entirety.

BACKGROUND

Technological Field

The present invention relates to a color verification apparatus, a color verification system, and a computer-readable storage medium storing a program to perform color verification.

Description of the Related Art

Specially prepared specific-color inks are used to print objects such as corporate colors or product logos because strict color reproduction is required. When print data is generated for these objects, there is provided a specific color version different from a CMYK version. Important colors are represented as specific color objects on the specific color version. For the purpose of quality control, color verification is performed to measure a color value of a printed specific color object and verify whether a predetermined color difference is satisfied.

Meanwhile, small-scale print jobs use a digital printer that uses only CMYK (cyan, magenta, yellow, and black) as color materials for electrophotographic printing or ink jet printing in order to reduce costs. Generally, CMYK is referred to as reference colors. Recently, digital printers can represent many color shades of specific color inks due to progress in color materials or image processes. There is an increasing need to use the digital printer using only CMYK as a color material for printed matters containing specific color objects.

FIG. 1 illustrates specific color printing and color verification on a conventional offset printer.

(1) A rasterization process (Raster Image Processor: RIP) is applied to an original document 1 (print data) containing a specific color object 1a to generate data of a specific color version 2 and a CMYK version 3. At the same time, each version is provided with a trim area and color verification patches 2p and 3p.

(2) Color conversion is applied to a RIP image of the CMYK version 3. The color conversion of the CMYK version 3 uses a target profile (CMYK to L*a*b*) and a printer profile (L*a*b* to CMYK') to convert CMYK values into CMYK' values.

(3) The specific color version 2 and the CMYK version 3 after the color conversion are produced and are supplied to an offset printer 100.

(4) The specific color version 2 is printed in specific color ink. The CMYK version 3 is printed in CMYK ink.

(5) A color measuring instrument 5 is used to measure a color of the color verification patch (specific color patch) 2p for specific color on a printed matter 4 to perform the color verification.

FIG. 2 illustrates specific color printing and color verification on a conventional digital printer.

(1) A RIP process is applied to the original document 1 (print data) containing the specific color object 1a to generate data of a specific color version 2D and a CMYK version 3D.

(2) Color conversion is applied to a RIP image of the CMYK version 3D. The color conversion of the CMYK version 3D uses the target profile and the printer profile to convert CMYK values into CMYK' values.

(3) A color conversion table is used to convert a specific color of the specific color version 2D into CMYK. The result is applied to the CMYK version 3D.

(4) Data of the CMYK version 3D after the color conversion is transmitted to a digital printer 110.

(5) All objects containing the specific color are printed in CMYK.

(6) The color measuring instrument 5 is used to measure a color of the specific color object 1a on a printed matter 4D to perform the color verification.

A color value of the printed specific color object 1a is measured by pressing a measurer (comparable to a color measuring aperture 5a in FIGS. 3A and 3B) of the cylindrical color measuring instrument 5 against the surface of the printed matter and calculating the color value based on a reflectivity inside the measurer. Accurate measurement is therefore unavailable if the specific color object 1a is smaller than a caliber of the color measuring aperture 5a of the color measuring instrument 5.

The color verification on the offset printer 100 capable of outputting large-size printed matters can be performed by supplementing the trim area with a color patch for color verification in the same color as the specific color object 1a and measuring the color of the color patch instead of the specific color object 1a. However, the digital printer 110 may not be able to ensure the trim area, making it impossible to perform the color verification by providing the trim area with the color patch.

FIGS. 3A and 3B are explanatory diagrams illustrating a difference in the color measurement accuracy due to relationship between a color measurement target and a color measuring aperture. According to an example in FIG. 3A, the outside diameter (Feret's diameter) of the color measurement target (the color verification patch 2p for specific color) is larger than the caliber of the color measuring aperture 5a of the color measuring instrument 5. The color measurement target covers the color measuring aperture 5a. The color measuring aperture 5a of the color measuring instrument 5 is therefore supplied with color information around the color measurement target. An accurate color measurement value can be acquired. According to an example in FIG. 3B, however, the outside diameter (Feret's diameter) of the color measurement target (the specific color object 1a) is smaller than the caliber of the color measuring aperture 5a of the color measuring instrument 5. The color measurement target does not cover the color measuring aperture 5a. The color measuring aperture 5a of the color measuring instrument 5 is not supplied with color information around the color measurement target. Only an inaccurate color measurement value can be acquired.

According to a disclosed technique (see Patent Literature 1), for example, a monitor displays a color patch smaller than the measuring area of a spectrometer. A correction coefficient is found by measuring the color patch by applying the black color to an area of the monitor other than the color patch. A corrective spectral distribution is acquired based on the spectral distribution and the correction coefficient acquired by the above-mentioned measurement.

CITATION LIST

Patent Literature

Patent Literature 1: JP 2010-203825 A

SUMMARY

The technique described in Patent Literature 1 previously finds a correction coefficient for color measurement of a measuring area smaller than or equal to a specifically sized aperture diameter and uses the correction coefficient to calculate a color measurement value of the measuring area smaller than or equal to the aperture diameter. If the size or the shape of a color measurement area differs from one printed matter to another, it is necessary to previously find correction coefficients for various combinations of a large number of sizes and shapes or to calculate a correction coefficient on an as-needed basis.

The present invention has been made in consideration of the foregoing. It is an object of the invention to perform the color verification without separately calculating a correction coefficient even when a color verification target object is smaller than the caliber of a color measuring aperture of a color measuring instrument.

To achieve the abovementioned object, according to an aspect of the present invention, a color verification apparatus reflecting one aspect of the present invention includes an input processor, a color measurement availability determiner, an estimation object list generator, a theoretical color value acquirer, a conversion coefficient calculator, a measured color value acquirer, an estimated color value calculator, and a color verifier.

The input processor accepts input of a RIP image based on a device-dependent color system and a color profile. The RIP image is generated by performing rasterization and color conversion on an original document image including a color verification target object for image formation in an image forming apparatus. The color profile defines correspondence relationship between a color space based on the device-dependent color system for the RIP image and a color space based on a device-independent color system.

The color measurement availability determiner compares the color verification target object with a color measuring aperture of a color measuring instrument and determines whether the color measuring instrument can perform color measurement on the color verification target object, based on a comparison result indicative whether the color verification target object completely covers the color measuring aperture of the color measuring instrument.

The estimation object list generator extracts an estimation object and generates a list on condition that the estimation object is comparable to an object belonging to objects included in the RIP image, maintains uniform device-dependent color values of constituent pixels, and completely covers a color measuring aperture of a color measuring instrument.

The theoretical color value acquirer acquires a device-dependent color value of each pixel in the RIP image, uses the color profile to convert the device-dependent color value into a device-independent color value, and acquires the device-independent color value as a theoretical color value.

The conversion coefficient calculator calculates a conversion coefficient in order to derive a theoretical color value of the color verification target object from a theoretical color value of the estimation object acquired by the theoretical color value acquirer.

The measured color value acquirer measures the estimation object in a printed matter including the RIP image formed by the image forming apparatus by using the color measuring instrument and acquires a measured color value of the estimation object.

The estimated color value calculator calculates an estimated color value of the color verification target object from a measured color value of the estimation object and the calculated conversion coefficient.

The color verifier performs color verification on the color verification target object in the printed matter based on an estimated color value of the color verification target object calculated by the estimated color value calculator and a theoretical color value of the color verification target object acquired by the theoretical color value acquirer when the color measurement availability determiner produces a determination result indicative that color measurement is unavailable to the color verification target object.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 7A and 7B are explanatory diagrams illustrating an external view of a color measuring instrument;

FIG. 8 is an explanatory diagram illustrating a color profile.

FIG. 10 is an explanatory diagram illustrating a screen-view to select a job that performs color verification according to the first embodiment of the present invention;

FIG. 11 is an explanatory diagram illustrating a screen-view to select an object targeted at the color verification according to the first embodiment of the present invention;

FIG. 12 is an enlarged view illustrating an extracted color verification target object;

FIGS. 14A to 14D are explanatory diagrams illustrating color measurement performed on an estimation object in a printed matter according to the first embodiment of the present invention;

FIG. 15 is an explanatory diagram illustrating a screen-view to display a color verification result according to the first embodiment of the present invention;

DETAILED DESCRIPTION OF EMBODIMENTS

Figure 1:
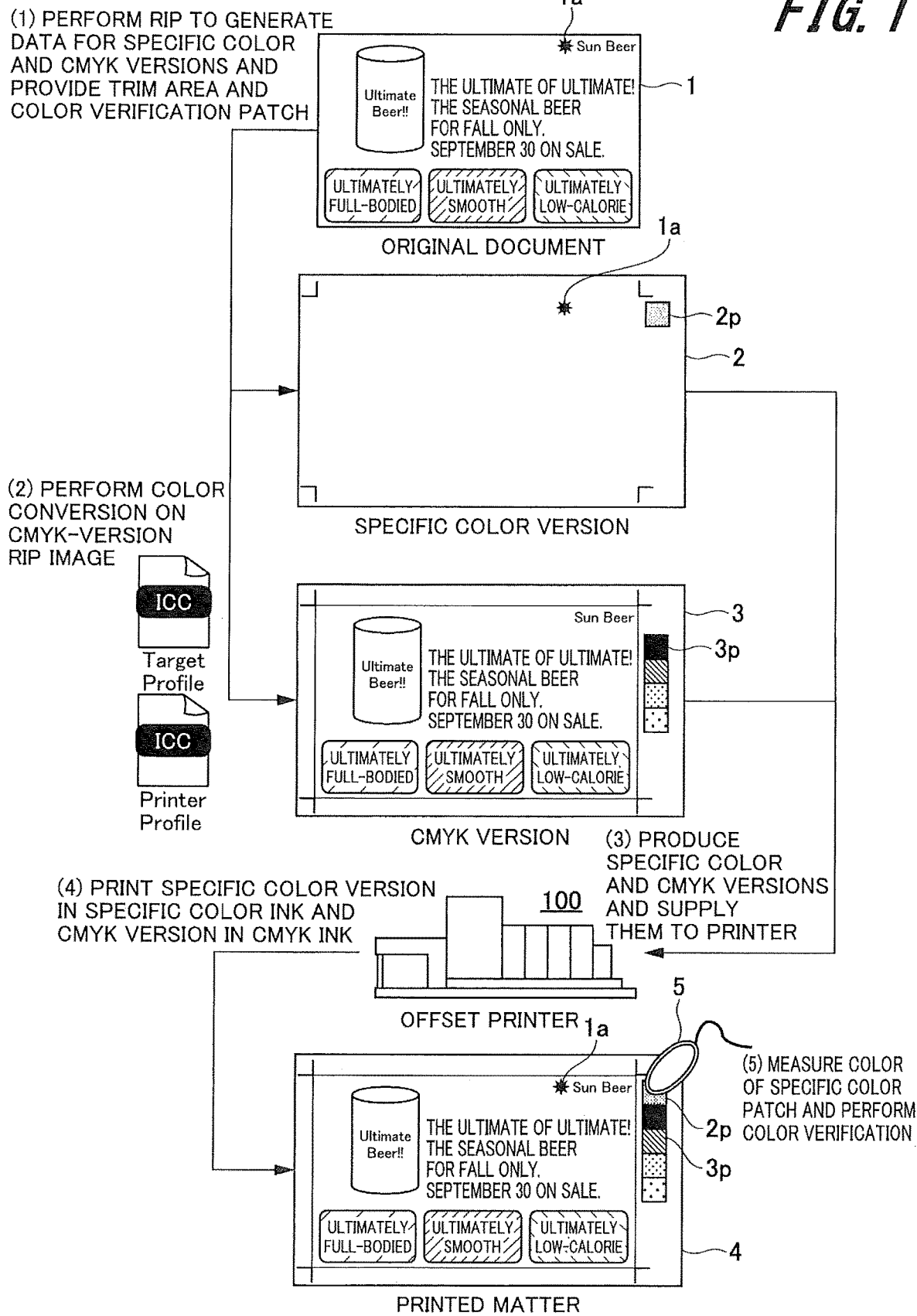
FIG. 1 is an explanatory diagram illustrating specific color printing and color verification on a conventional offset printer.

Hereinafter, one or more embodiments of the present invention will be described with reference to the drawings. However, the scope of the invention is not limited to the disclosed embodiments. In the specification and the accompanying drawings, constituent elements having substantially the same functions or configurations are designated by the same reference numerals and a duplicate description is omitted.

1. First Embodiment

Configuration of the Entire Color Verification System

Figure 4:
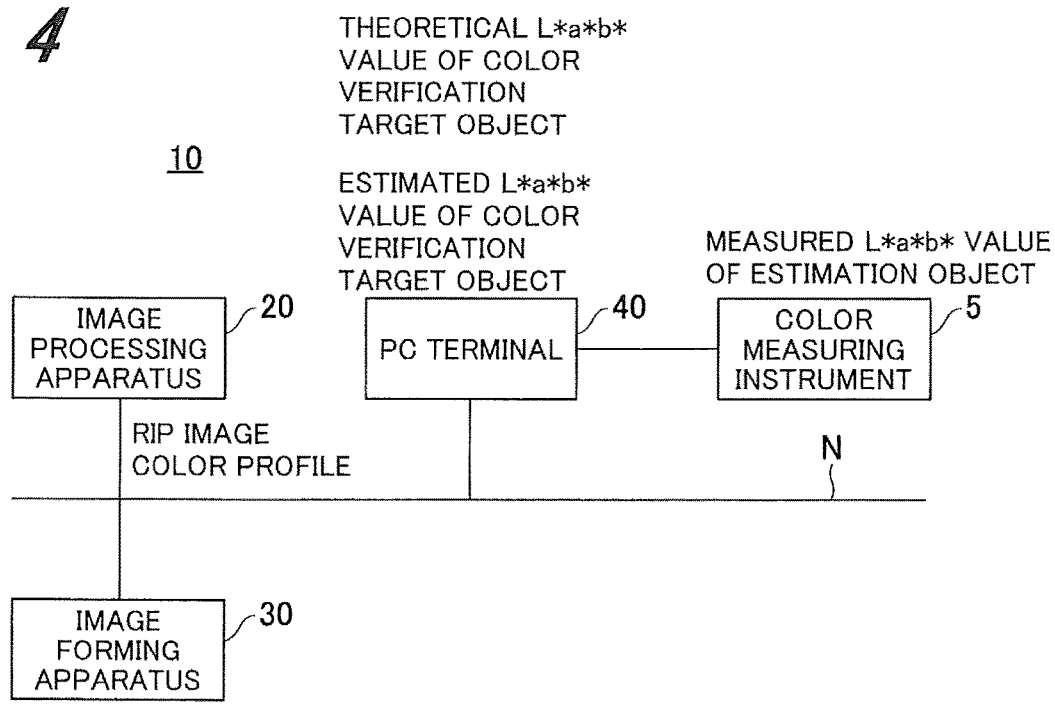
FIG. 4 is an explanatory diagram illustrating a configuration of an entire color verification system according to a first embodiment of the present invention.

The description below explains a configuration of the entire color verification system according to the first embodiment of the present invention. FIG. 4 is an explanatory diagram illustrating a configuration of the entire color verification system according to the first embodiment.

A color verification system 10 illustrated in FIG. 4 includes an image processing apparatus 20, an image forming apparatus 30, a PC terminal 40, and a color measuring instrument 5. The image processing apparatus 20, the image forming apparatus 30, and the PC terminal 40 are connected with each other via network N capable of mutual transmission and reception of data. The PC terminal 40 and the color measuring instrument 5 are connected with each other via a communication bus so as to be capable of control that allows the PC terminal 40 to acquire color measurement values from the color measuring instrument 5.

In response to a print request from the PC terminal 40, the image processing apparatus 20 applies RIP processing (from RGB to CMYK, for example) to original document data (such as the RGB color system) to generate images in the image forming apparatus 30 and also performs color conversion. The image processing apparatus 20 transmits the color-converted RIP image and a color profile defining the color space for the RIP image to the PC terminal 40. The RIP image is represented as color values in the color space based on the CMYK color system, for example. The CMYK color system provides an example of device-dependent color systems generally used for digital printers.

The image forming apparatus 30 provides an example of digital printers and forms an image on the paper based on a job (RIP image) and produces a printed matter. The image forming apparatus 30 is available as an electrophotographic image forming apparatus or an ink jet recording apparatus. The image forming apparatus 30 outputs a RIP image corresponding to the job to the paper by using reference colors (four colors) of the CMYK color system. The digital printer is not limited to the use of four reference colors. When image forming apparatus 30 uses six reference colors, for example, the six reference colors are used to represent specific colors for original document data. The color profile also corresponds to the six colors.

By measuring a color verification target object on the printed matter, a measured color value (measured $L^*a^*b^*$ value) in the color space based on an $L^*a^*b^*$ color system is generated under control of the PC terminal 40. The color measuring instrument 5 transmits the measured color value (measured $L^*a^*b^*$ value) to the PC terminal 40. The $L^*a^*b^*$ color system provides an example of device-independent color systems. Other color systems such as XYZ may be used as device-independent color systems.

The PC terminal 40 includes a printer driver and generates a job for the original document data in response to a user instruction. When performing the color verification, the PC terminal 40 calculates a theoretical $L^*a^*b^*$ value (theoretical color value) for a color verification target object in the color space of the $L^*a^*b^*$ color system based on the RIP image and the color profile. The PC terminal 40 calculates an estimated $L^*a^*b^*$ value (estimated color value) for the color verification target object in the color space of the $L^*a^*b^*$ color system from a measured $L^*a^*b^*$ value (measured color value) for another object (estimation object) different from the color verification target object in the printed matter. The color verification is performed based on the theoretical $L^*a^*b^*$ value and the estimated $L^*a^*b^*$ value of the color verification target object.

The configuration of the color verification system is provided as an example. The image forming apparatus 30 may include the functions of all or some of the apparatuses illustrated in FIG. 4. Alternatively, the PC terminal 40 may include an unshown RIP unit to perform rasterization for the image processing apparatus 20 and an unshown color converter to perform color conversion based on the color profile or the color conversion table.

Configuration of the PC Terminal

The description below explains an example hardware configuration of the PC terminal 40.

Figure 5:
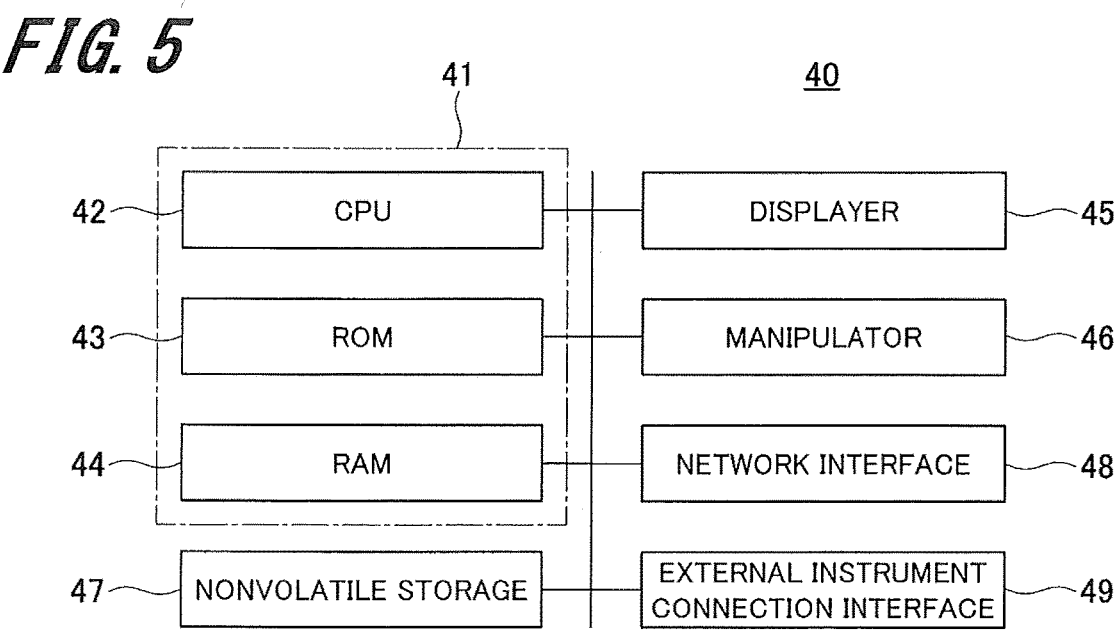
FIG. 5 is a block diagram illustrating a hardware configuration of a PC terminal according to the first embodiment of the present invention.

FIG. 5 is a block diagram illustrating a hardware configuration of the PC terminal 40.

As illustrated in FIG. 5, the PC terminal 40 includes a controller 41, a displayer 45, a manipulator 46, a nonvolatile storage 47, a network interface 48, and an external instrument connection interface 49. The components are connected with each other via a system bus so as to be capable of data communication.

The controller 41 includes a CPU (Central Processing Unit) 42, a ROM (Read Only Memory) 43, and a RAM (Random Access Memory) 44. The controller 41 is used as an example of a computer to control operations of components in the PC terminal 40. The CPU 42 executes program codes of the software to implement functions according to the embodiment by reading the program codes from the ROM 43 (example storage medium). Cooperation of the hardware and the software implements the functions of the PC terminal 40. The CPU 42 may be replaced by other arithmetic processing units such as an MPU (Micro Processing Unit).

The RAM 44 is provided as an example of volatile recording media and is used as a work area. The RAM 44 temporarily stores information (data) needed for processes performed by the CPU 42 and variables or parameters generated during arithmetic processing of the CPU 42.

The displayer 45 is provided as a liquid crystal display, for example, and displays various types of information such as results of processes performed by the CPU 42. The manipulator 46 represents a pointing device such as a mouse or a touch panel and a keyboard and enables a user to perform specified operations and enter instructions.

The nonvolatile storage 47 is provided as an example of recording media and stores a program for the CPU 42 to control each component, a program such as an OS (Operating System), and data. The nonvolatile storage 47 includes an HDD, an SSD (Solid State Drive), an optical disk, a magneto-optical disk, a CD-ROM, a CD-R, magnetic tape, and a nonvolatile memory card, for example. Programs may be supplied via wired or wireless transmission media such as a local area network (LAN), the Internet, and digital satellite broadcasting.

The network interface 48 includes an NIC (Network Interface Card) or a modem, for example, establishes connection with an apparatus as a communication partner via network N such as LAN, and transmits and receives various types of data.

The external instrument connection interface 49 outputs control signals to the color measuring instrument 5 via the communication path and provides an interface to receive color measurement values from the color measuring instrument 5.

As above, the ROM 43 or the nonvolatile storage 47 stores various types of programs or data. The ROM 43 or the nonvolatile storage 47 stores the following programs.

Program to determine whether the color measurement is available to color verification target objects
Program to generate an estimation object list
Program to acquire theoretical L*a*b* values of objects
Program to acquire measured L*a*b* values of estimation objects
Program to calculate conversion coefficients
Program to acquire estimated L*a*b* values of color verification target objects
Color verification program The ROM 43 or the nonvolatile storage 47 stores the following data.
RIP images
Color profiles
Estimation object list
Various L*a*b* values Internal Configuration of the Controller The description below explains an example internal configuration of the controller 41.

Figure 6:
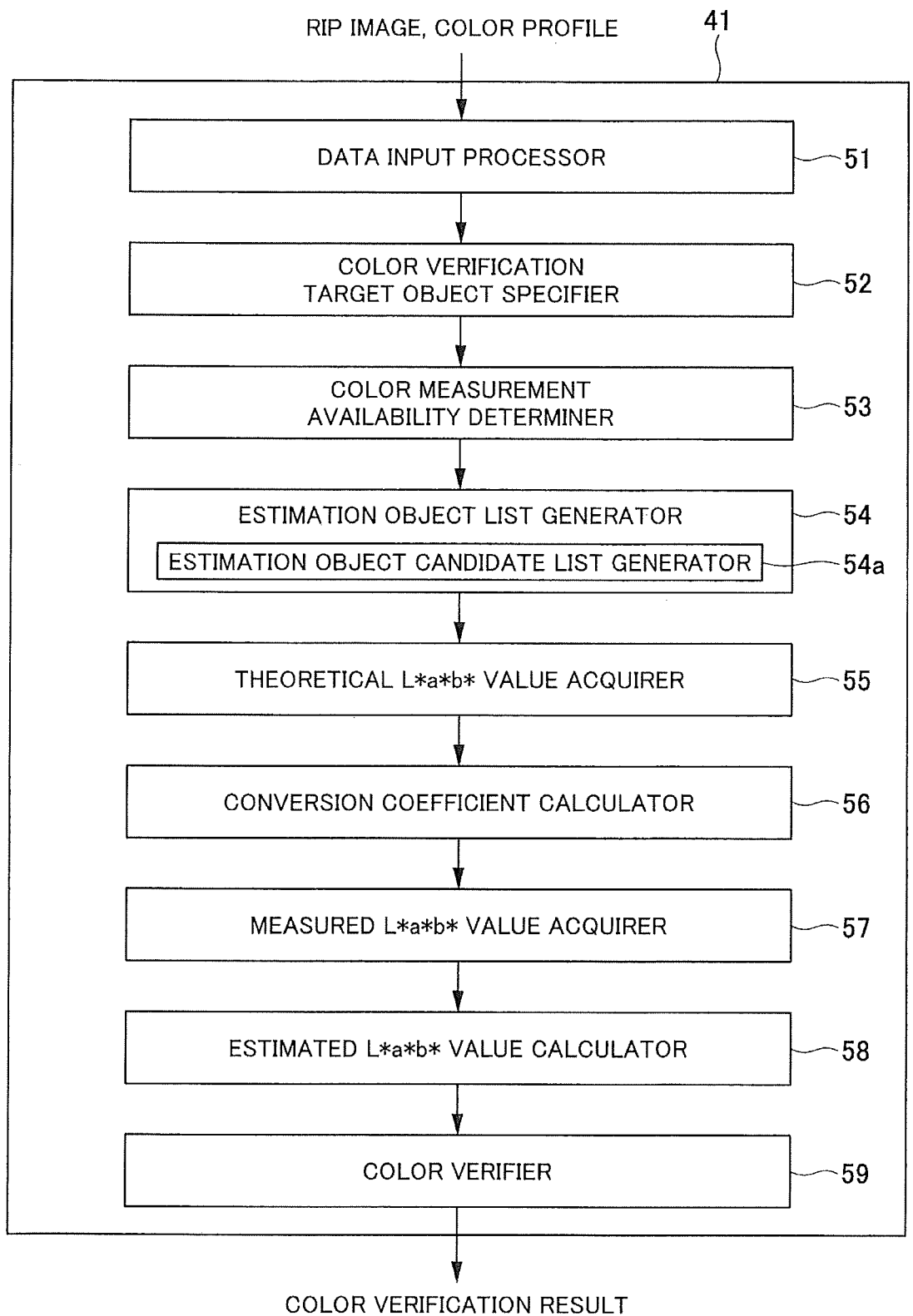
FIG. 6 is a block diagram illustrating an internal configuration of a controller of the PC terminal according to the first embodiment of the present invention.

FIG. 6 is a block diagram illustrating an internal configuration of the controller 41 of the PC terminal 40.

As illustrated in FIG. 6, the controller 41 includes a data input processor 51, a color verification target object specifier 52, a color measurement availability determiner 53, and an estimation object list generator 54. The controller 41 further includes a theoretical L*a*b* value acquirer 55, a conversion coefficient calculator 56, a measured L*a*b* value acquirer 57, an estimated L*a*b* value calculator 58, and a color verifier 59.

Figure 2:
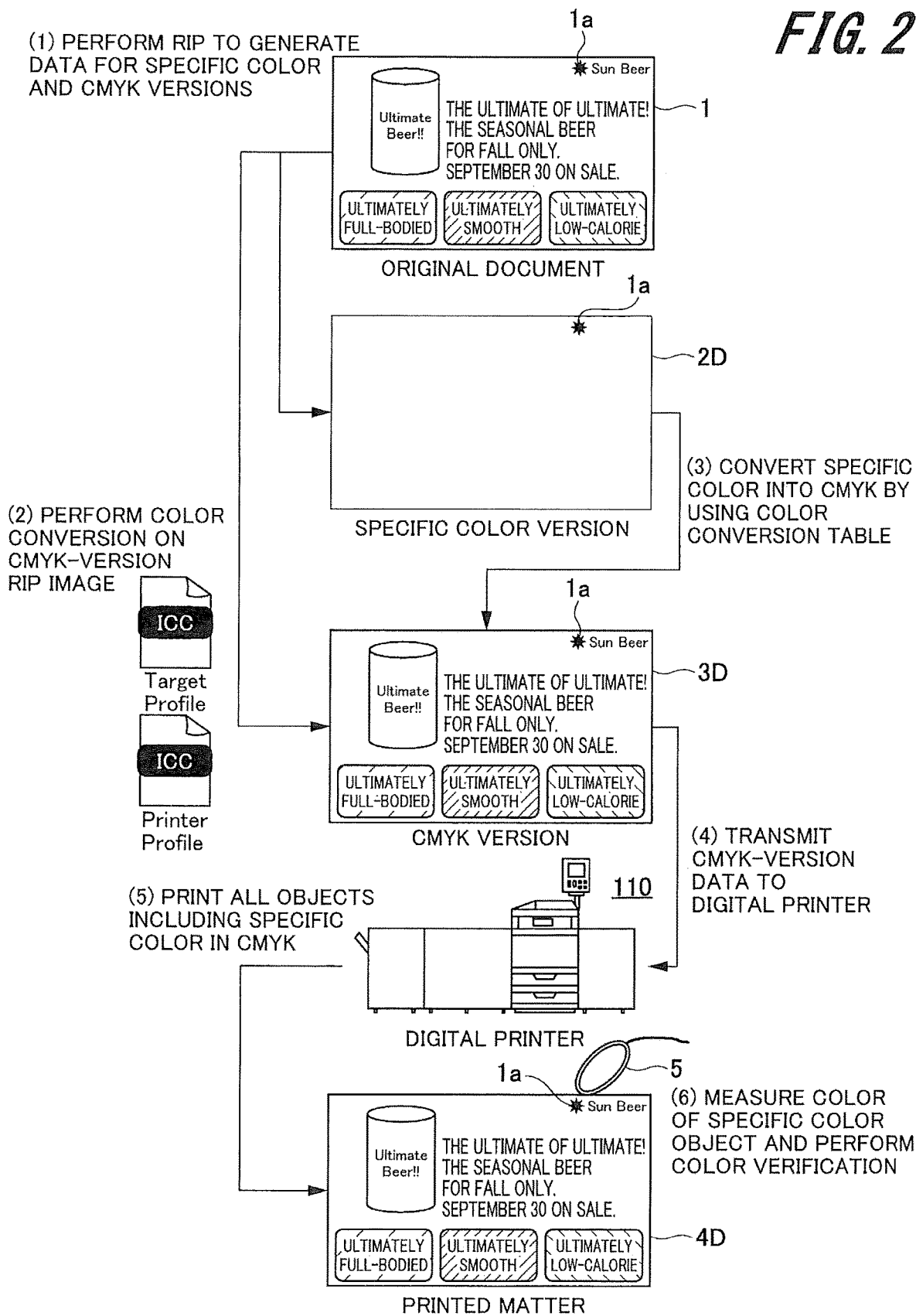
FIG. 2 is an explanatory diagram illustrating specific color printing and color verification on a conventional digital printer.

The data input processor 51 (an example input processor) performs a process to accept input of a RIP image and a color profile from the image processing apparatus 20. The RIP image is generated by applying the RIP process and the color conversion to an original document image (such as RGB) containing the color verification target object for image formation on the image forming apparatus 30 and is represented by a device-dependent color system (such as CMYK). It is assumed that the color conversion table is used to convert specific colors of a specific color object in the RIP image into CMYK colors (see (3) in FIG. 2). The color profile defines the correspondence relationship between a color space of the device-dependent color system and a color space of the device-independent color system for RIP images.

The color verification target object specifier 52 performs a process to accept the specification of a color verification target object out of objects contained in the RIP image accepted by the data input processor 51. The present embodiment is configured so that a user can specify the color verification target object in the RIP image by manipulating the manipulator 46.

The color measurement availability determiner 53 compares a color verification target object with the color measuring aperture 5a of the color measuring instrument 5. The color measurement availability determiner 53 determines whether the color measuring instrument 5 can perform accurate color measurement on the color verification target object, based on a comparison result indicating whether the color verification target object completely covers the color measuring aperture 5a of the color measuring instrument 5.

The estimation object list generator 54 generates a list of estimation objects usable for estimating a color value of the color verification target object. Specifically, the estimation object list generator 54 extracts estimation objects from objects contained in the RIP image and generates a list on condition that the estimation object indicates uniform device-dependent color values (CMYK values) for constituent pixels and completely covers the color measuring aperture 5a of the color measuring instrument 5. Operations of the estimation object list generator 54 will be described in detail later with reference to FIG. 16. The estimation object list generator 54 according to the present embodiment includes an estimation object candidate list generator 54a. Operations of the estimation object candidate list generator 54a will be described in detail later with reference to FIG. 18.

The theoretical L*a*b* value acquirer 55 (example theoretical color value acquirer) acquires device-dependent color values (CMYK values) for pixels in a RIP image, converts the device-dependent color values into device-independent color values (L*a*b* values) by using the input color profile, and acquires theoretical color values (theoretical L*a*b* values).

The conversion coefficient calculator 56 calculates a conversion coefficient in order to derive a theoretical L*a*b* value of the color verification target object from the theoretical L*a*b* value of the estimation object acquired by the theoretical L*a*b* value acquirer 55. A method of calculating the conversion coefficient will be described later.

The measured L*a*b* value acquirer 57 (example measured color value acquirer) acquires a measured L*a*b* value (measured color value) of the estimation object in the printed matter that contains the RIP image generated by the image forming apparatus 30 and is measured by the user using the color measuring instrument 5.

The estimated L*a*b* value calculator 58 (example estimated color value calculator) calculates an estimated L*a*b* value (estimated color value) of the color verification target object from the measured L*a*b* value of the estimation object and the conversion coefficient calculated by the conversion coefficient calculator 56.

The color verifier 59 performs the color verification as described next when the color measurement availability determiner 53 determines that the color measurement is unavailable to the color verification target object as a determination result. Namely, the color verifier 59 performs the color verification on the color verification target object in the printed matter based on the estimated color value of the color verification target object calculated by the estimated L*a*b* value calculator 58 and the theoretical color value of the color verification target object acquired by the theoretical L*a*b* value acquirer 55.

Color Measuring Instrument

With reference to FIGS. 7A and 7B, the description below explains an external view of the color measuring instrument 5 to perform color measurement on color verification target objects. FIGS. 7A and 7B are explanatory diagrams illustrating an external view of the color measuring instrument 5. FIG. 7A illustrates an external view of the color measuring instrument 5 viewed obliquely from above. FIG. 7B illustrates a rear view of the color measuring instrument 5.

The color measuring instrument 5 irradiates the light from a light source included in the color measuring instrument 5 to a measurement object via the color measuring aperture 5a and acquires a color value of the measurement object as the device-independent color system value such as an L*a*b* value based on the spectroscopic reflectivity of the reflected light. The actual color measurement acquires the above-mentioned reflected light by tightly pressing the color measuring aperture 5a against the color measurement target.

Color Profile

With reference to FIG. 8, the description below explains the concept of the color profile.

FIG. 8 is an explanatory diagram illustrating the color profile.

Color profile CP defines the correspondence relationship of color values representing the same color in two different color spaces. The color profile CP according to the present embodiment is provided as a color profile representing the color space of RIP images for the image forming apparatus 30 to form images by using CMYK color materials and therefore defines the correspondence relationship between a CMYK value and an L*a*b* value. A target profile, one of the color profiles, defines the correspondence relationship between a CMYK value and an L*a*b* value. A printer profile defines the correspondence relationship between an L*a*b* value and a CMYK' value. The use of these profiles can convert colors from CMYK values into CMYK' values.

Color Verification Process

Figure 9:
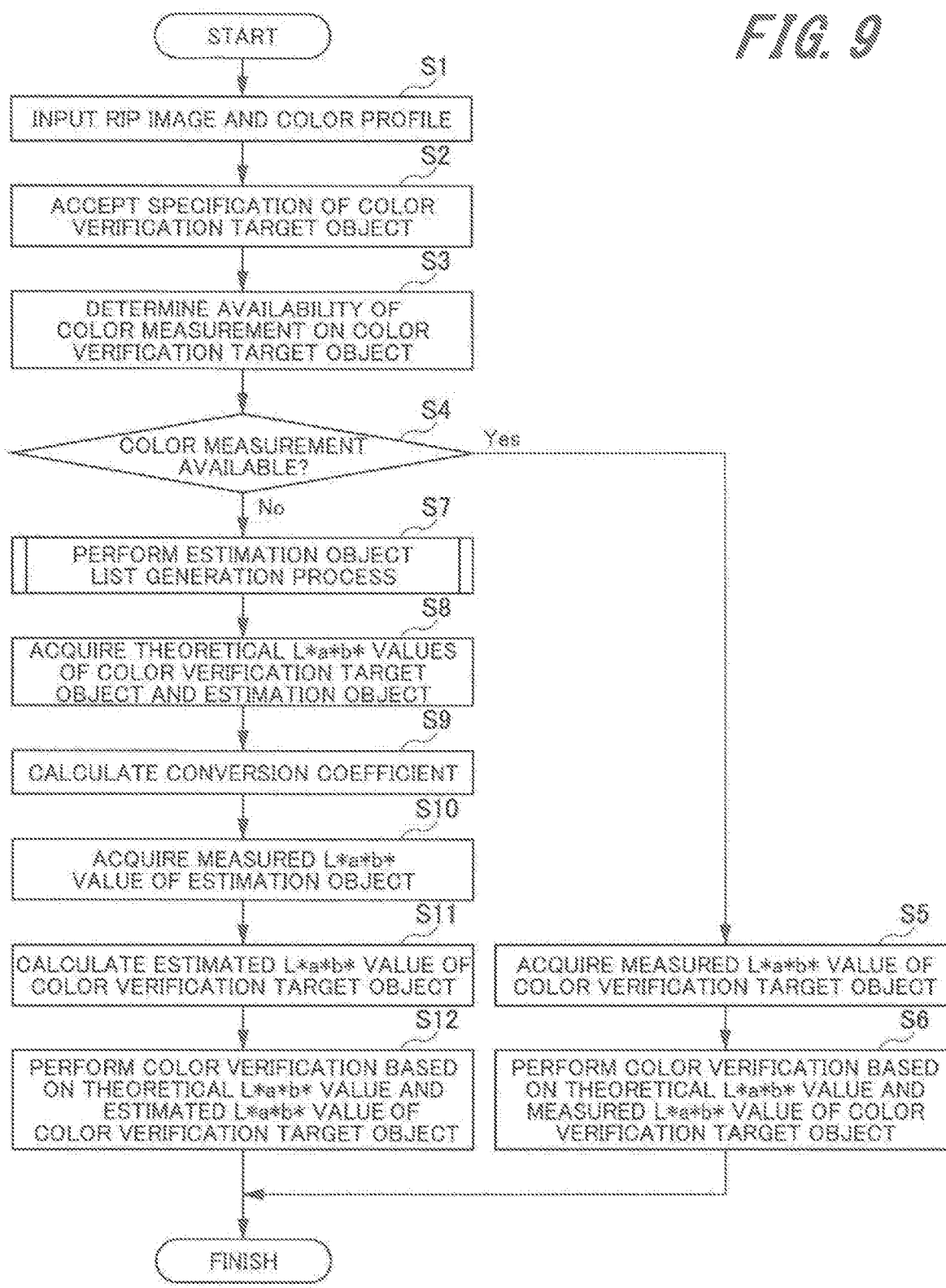
FIG. 9 is a flowchart illustrating a flow of a color verification process performed by the color verification system according to the first embodiment of the present invention.

With reference to FIG. 9, the description below explains an example flow of the color verification process performed by the color verification system 10.

FIG. 9 is a flowchart illustrating a flow of the color verification process performed by the color verification system 10.

The data input processor 51 of the PC terminal 40 (controller 41) accepts input of a RIP image and a color profile from the image processing apparatus 20 via network N (S1). During input of the RIP image and the color profile, the data input processor 51 allows the displayer 45 to display a UI (User Interface) screen-view as illustrated in FIG. 9 and accepts the specification of a job to acquire the RIP image and the color profile from a user. The data input processor 51 acquires the RIP image and the color profile for the specified job from the image processing apparatus 20.

Color Verification Job Selection Screen-View

With reference to FIG. 10, the description below explains an example screen-view to select a job that performs the color verification.

The color verification job selection screen-view 60 illustrated in FIG. 10 shows a list of jobs capable of performing (selecting) the color verification and the date and time of job creation. When a user specifies a job on the color verification job selection screen-view 60 and then clicks the OK button, a RIP image and a color profile used for the color verification are automatically acquired.

Return to the description of FIG. 9. After the process at step S1, the color verification target object specifier 52 displays a RIP image 81 in a UI screen-view as illustrated in FIG. 11 and accepts the specification of a color verification target object from a user (S2). The RIP image 81 corresponds to the specific color object 1a as data of CMYK version 3D illustrated in FIG. 2 as a result of converting the color value from specific colors into CMYK colors. The RIP image 81 as a representation of the specific color object 1a in CMYK colors is hereinafter also referred to as a "RIP image 3D."

Color Verification Target Object Selection Screen-View

With reference to FIG. 11, the description below explains an example screen-view to select an object targeted at the color verification. A color verification target object selection screen-view 70 illustrated in FIG. 11 displays the RIP image 81 containing the specific color object 1a. The color verification target object selection screen-view 70 provides an area to display a target value (comparable to a theoretical color value) for the color value, a measured value (comparable to a measured color value), and an error (color difference) between the target value and the measured value.

The color verification target object specifier 52 accepts the specification of the color verification target object, compares color values of the clicked pixel and nearby pixels, concatenates the pixels until finding different color values, and thereby detects an area comprised of pixels having the same color values. For example, the color verification target object specifier 52 extracts the specific color object 1a as the color verification target object from the RIP image 81 as illustrated in FIG. 12. The description below explains a case where the specific color object 1a is assumed to be the color verification target object.

Return to the description of FIG. 9. The color measurement availability determiner 53 determines whether the color measurement is available to the selected color verification target object (S3). During this determination process, the color measurement availability determiner 53 generates an object corresponding to the color measuring aperture 5a of the color measuring instrument 5 by using the resolution of the RIP image and determines whether the color verification target object covers the color measuring aperture 5a.

FIG. 12 illustrates an extracted color verification target object.

Figure 3A:
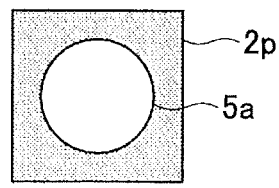
FIGS. 3A and 3B are explanatory diagrams illustrating a difference in the color measurement accuracy due to relationship between a color measurement target and a color measuring aperture.
Figure 3B:
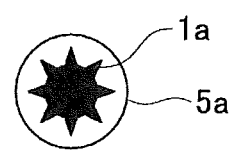

The specific color object 1a is selected as the color verification target object. As illustrated in FIG. 3A, the color measuring instrument 5 can perform accurate color measurement (color measurement available) when the specific color object 1a as a measurement object is larger than the caliber of the color measuring aperture 5a and the specific color object 1a covers the color measuring aperture 5a. As illustrated in FIG. 3B, the color measuring instrument 5 cannot perform accurate color measurement (color measurement unavailable) when the specific color object 1a as a measurement object is smaller than the caliber of the color measuring aperture 5a and the specific color object 1a does not cover the color measuring aperture 5a.

Return to the description of FIG. 9. The measured L*a*b* value acquirer 57 determines whether the color measurement is available based on the color measurement availability determination result from the color measurement availability determiner 53 (S4). If the color measurement is available (Yes at S4), the process acquires the measured L*a*b* value of the specific color object 1a (S5). Specifically, the measured L*a*b* value acquirer 57 instructs the user to perform color measurement on the specific color object 1a using the color measuring instrument 5 via an unshown UI screen-view and acquires the measured L*a*b* value of the specific color object 1a in the printed matter whose color is measured by the color measuring instrument 5. In parallel with this process, the theoretical L*a*b* value acquirer 55 acquires a CMYK value (device-dependent color value) of each pixel in the RIP image, uses the color profile to convert the CMYK value into an L*a*b* value (device-independent color value), and acquires the L*a*b* value as a theoretical L*a*b* value.

The color verifier 59 performs color verification on the specific color object 1a based on the theoretical L*a*b* value and the measured L*a*b* value of the specific color object 1a. The process at steps S5 and S6 is equal to that of the related art.

If the color measurement is unavailable (No at S4), the estimation object list generator 54 generates an estimation object list (S7). The estimation object list generation process will be described in detail later with reference to FIG. 16.

The theoretical L*a*b* value acquirer 55 converts the CMYK value of the specific color object 1a as the color verification target object into an L*a*b* value based on the correspondence relationship between the CMYK value and the L*a*b* value defined in the color profile and thereby acquires a theoretical L*a*b* value. Similarly, the theoretical L*a*b* value acquirer 55 acquires a theoretical L*a*b* value of the estimation object based on the color profile (S8).

The conversion coefficient calculator 56 calculates a conversion coefficient in order to derive a theoretical L*a*b* value of the color verification target object from the theoretical L*a*b* value of the estimation object (S9). Specifically, the conversion coefficient calculator 56 performs the interpolation from the theoretical L*a*b* value of the estimation object as expressed in equation (1) below to calculate interpolation coefficients h, i, j, and k needed to find the theoretical L*a*b* value of the specific color object 1a and uses the interpolation coefficients as conversion coefficients.

$$L^*_0 = hL^*_1 + iL^*_2 + jL^*_3 + kL^*_4$$

$$a^*_0 = ha^*_1 + ia^*_2 + ja^*_3 + ka^*_4$$

$$b^*_0 = hb^*_1 + ib^*_2 + jb^*_3 + kb^*_4 \quad (1)$$

The measured L*a*b* value acquirer 57 acquires the measured L*a*b* value of the estimation object (S10). Specifically, the measured L*a*b* value acquirer 57 allows the displayer 45 to display a UI screen-view illustrated in FIG. 13, displays a color measurement position (estimation object) in the RIP image, and thereby instructs the user to measure the estimation object for color measurement. The user measures the position in the printed matter using the color measuring instrument 5 and thereby acquires the measured L*a*b* value of the estimation object. The process at step S10 is equal to the process at step S5 in terms of displaying the color measurement position in the RIP image and instructing the user to perform the color measurement.

Screen-View to Instruct the Color Measurement on a Color Verification Target Object With reference to FIG. 13, the description below explains an example screen-view that instructs the color measurement on an object targeted at the color verification.

Figure 13:
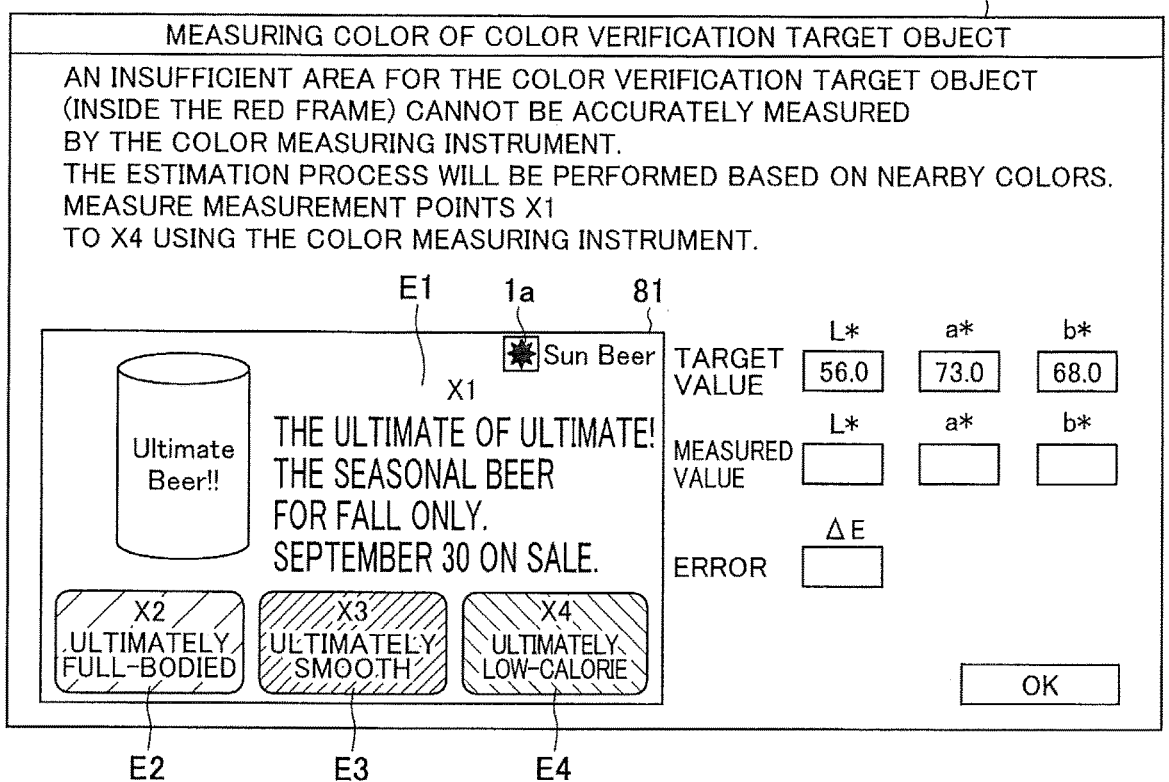
FIG. 13 is an explanatory diagram illustrating a screen-view to specify color measurement of an object targeted at the color verification according to the first embodiment of the present invention.

A color verification target object color measurement instruction screen-view 80 as illustrated in FIG. 13 displays a message notifying that an estimation process is performed based on nearby colors because a color verification target object cannot be measured accurately and that a user is requested to measure specified nearby objects. For example, the message in FIG. 13 is displayed as "An insufficient area for the color verification target object (inside the red frame) cannot be accurately measured by the color measuring instrument. The estimation process will be performed based on nearby colors. Measure measurement points X1 to X4 using the color measuring instrument." The user confirms measurement points X1 to X4 specified in the RIP image 81 and measures four estimation objects E1 to E4 corresponding to measure measurement points X1 to X4 on printed matter 4D using the color measuring instrument 5.

The color verification target object color measurement instruction screen-view 80 in FIG. 13 displays theoretical L*a*b* values as target values of the color verification target object (specific color object 1a) selected in the color verification target object selection screen-view 70 in FIG. 11. The example in FIG. 13 shows target value "56.0" for L*, target value "73.0" for a*, and target value "68.0" for b*.

FIGS. 14A to 14D illustrate how the color measurement is performed on an estimation object in the printed matter.

The user measures approximately rectangular estimation object E2 (FIG. 14A) in printed matter 4D containing measurement point X2 using the color measuring instrument 5 according to the instruction displayed on the color verification target object color measurement instruction screen-view 80 in FIG. 13. Similarly, the user measures approximately rectangular estimation object E3 (FIG. 14B) in printed matter 4D corresponding to measurement point X3, approximately rectangular estimation object E4 (FIG. 14C) in printed matter 4D corresponding to measurement point X4, and estimation object E1 (FIG. 14D) in printed matter 4D corresponding to measurement point X1 as a background.

Return to the description of FIG. 9. The estimated L*a*b* value calculator 58 calculates an estimated L*a*b* value of the specific color object 1a as a color verification target object (S11). Specifically, the estimated L*a*b* value calculator 58 uses $(L'^*_1, b'^*_1)$ through $(L'^*_4, a'^*_4, b'^*_4)$ as measured L*a*b* values of the estimation object and conversion coefficients h, i, j, and k and calculates $(L'^*_0, a'^*_0, b'^*_0)$ as estimated L*a*b* values of the color verification target object as expressed in equation (2) below.

$$L'^*_0 = hL'^*_1 + iL'^*_2 + jL'^*_3 + kL'^*_4$$

$$a'^*_0 = ha'^*_1 + ia'^*_2 + ja'^*_3 + ka'^*_4$$

$$b'^*_0 = hb'^*_1 + ib'^*_2 + jb'^*_3 + kb'^*_4 \quad (2)$$

The color verifier 59 performs the color verification based on the theoretical L*a*b* values (target values) and the estimated L*a*b* values of the color verification target object (S12) and allows the displayer 45 to display a color verification result. After this process terminates, the color verification system 10 terminates the color verification process.

Color Verification Result Display Screen-View

FIG. 15 is an explanatory diagram illustrating a screen-view to display a color verification result.

For example, a color verification result display screen-view 90 illustrated in FIG. 15 displays a color difference (error) between the theoretical L*a*b* value (target value) and the estimated L*a*b* value (measured value) of the color verification target object as a color verification result. The example in FIG. 15 shows estimated L*a*b* value "55.1" for L*, estimated L*a*b* value "71.5" for a*, estimated L*a*b* value "65.2" for b* and color difference (4E) "3.3" between the target value (theoretical L*a*b* value) and the estimated L*a*b* value (estimated L*a*b* value). The content of the color verification is not limited to the color difference if the content can be verified from device-independent color values such as L*a*b* values.

Estimation Object List Generation Process

The description below explains a flow of the estimation object list generation process at step S7 in FIG. 9.

Figure 16:
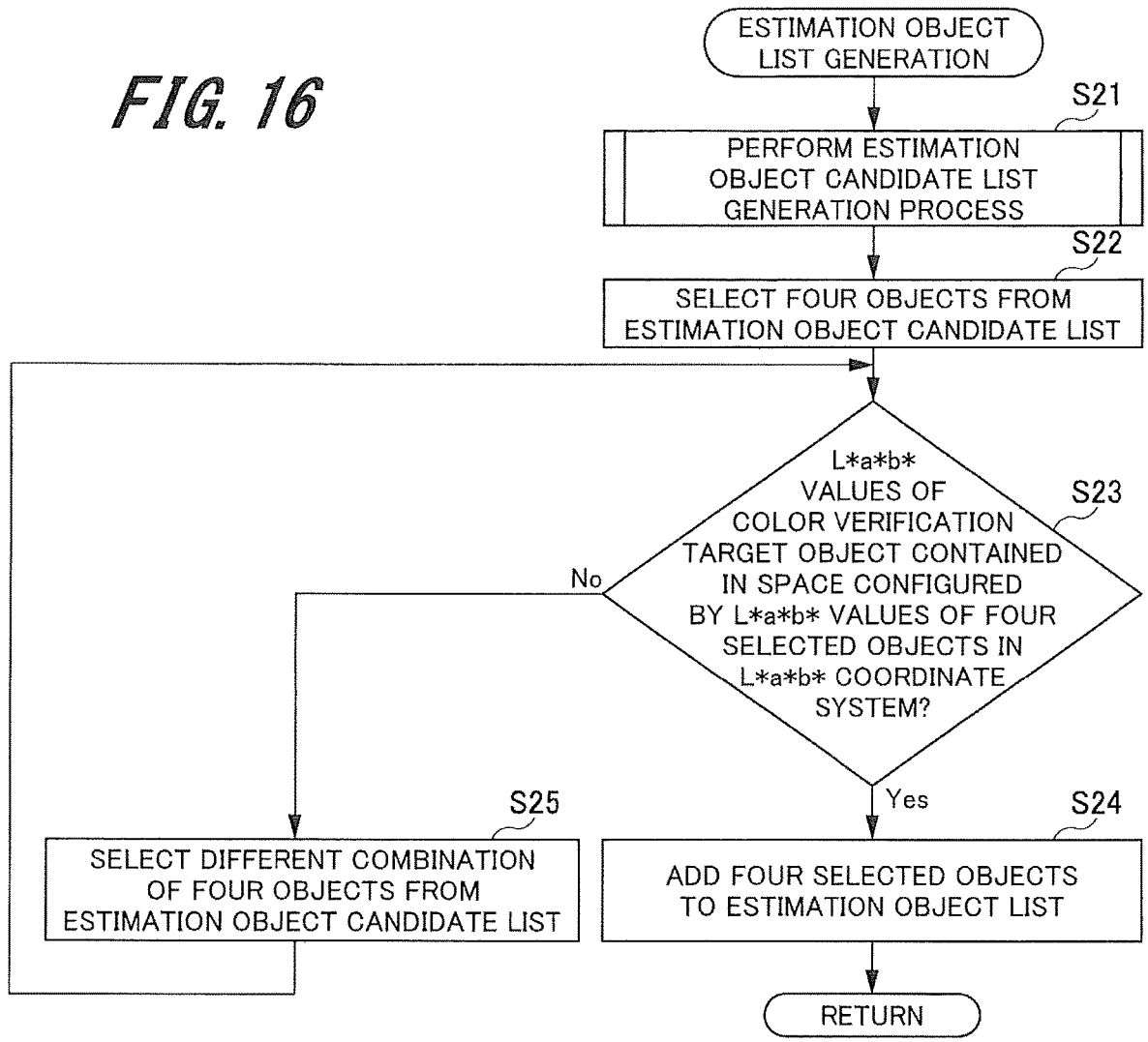
FIG. 16 is a flowchart illustrating a flow of an estimation object list generation process in FIG. 9.

FIG. 16 is a flowchart illustrating a flow of the estimation object list generation process.

The estimation object list generator 54 generates an estimation object candidate list (S21). The estimation object candidate list generator 54*a* (FIG. 6) generates the estimation object candidate list. The estimation object candidate list generation process will be described in detail later with reference to FIG. 18.

The estimation object list generator 54 optionally selects four objects from the estimation object candidate list (S22). The estimation object list generator 54 determines whether the L*a*b* values of the color verification target object (specific color object 1*a*) are contained in a space (see FIG. 17) configured by L*a*b* values of four selected objects Obj1 through Obj4 in the L*a*b* coordinate system (S23).

Figure 17:
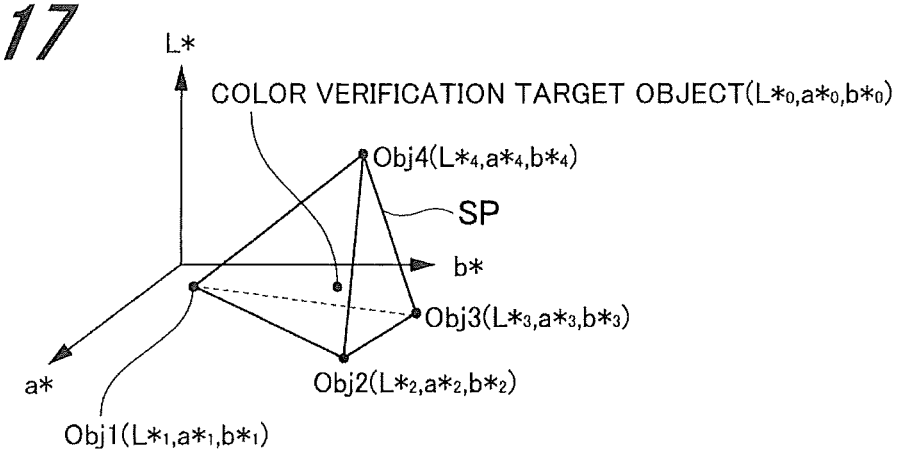
FIG. 17 is an explanatory diagram illustrating an estimation object selection method according to the first embodiment of the present invention (when interpolation is performed)

FIG. 17 is an explanatory diagram illustrating a method of selecting an estimation object.

The L*a*b* values of four objects Obj1 through Obj4 form a triangular-pyramid space SP in the L*a*b* coordinate system. If space SP contains L*a*b* values of the color verification target object, the estimation object list generator 54 selects four selected objects Obj1 through Obj4 as estimation objects and adds them to the estimation object list (S24). The estimation object list registers positions of four objects Obj1 through Obj4 in RIP image 3D (FIG. 2) and positions (color values) in the L*a*b* coordinate system. The selection method illustrated in FIG. 17 provides an example of using the interpolation calculation to find a conversion coefficient at step S9 in FIG. 9.

Meanwhile, space SP configured by the L*a*b* values of four objects Obj1 through Obj4 may not contain L*a*b* values of the color verification target object (No at S23). In this case, the estimation object list generator 54 selects a different combination of four objects from the estimation object candidate list (S25). After selecting the different combination of four objects at step S25, the estimation object list generator 54 proceeds to the process at step S23.

The estimation object list generator 54 determines whether space SP configured by the L*a*b* values of newly selected four objects Obj1 through Obj4 contains L*a*b* values of the color verification target object (S23). The process proceeds to step S24 if space SP contains the L*a*b* values of the object targeted at the verification (Yes at S23).

The estimation object list generator 54 adds four selected objects Obj1 through Obj4 to the estimation object list (S24). After terminating the process at step S24, the estimation object list generator 54 returns to the process at step S8 in FIG. 9.

Estimation Object Candidate List Generation Process

The description below explains an example flow of the estimation object candidate list generation process at step S21 in FIG. 16.

Figure 18:
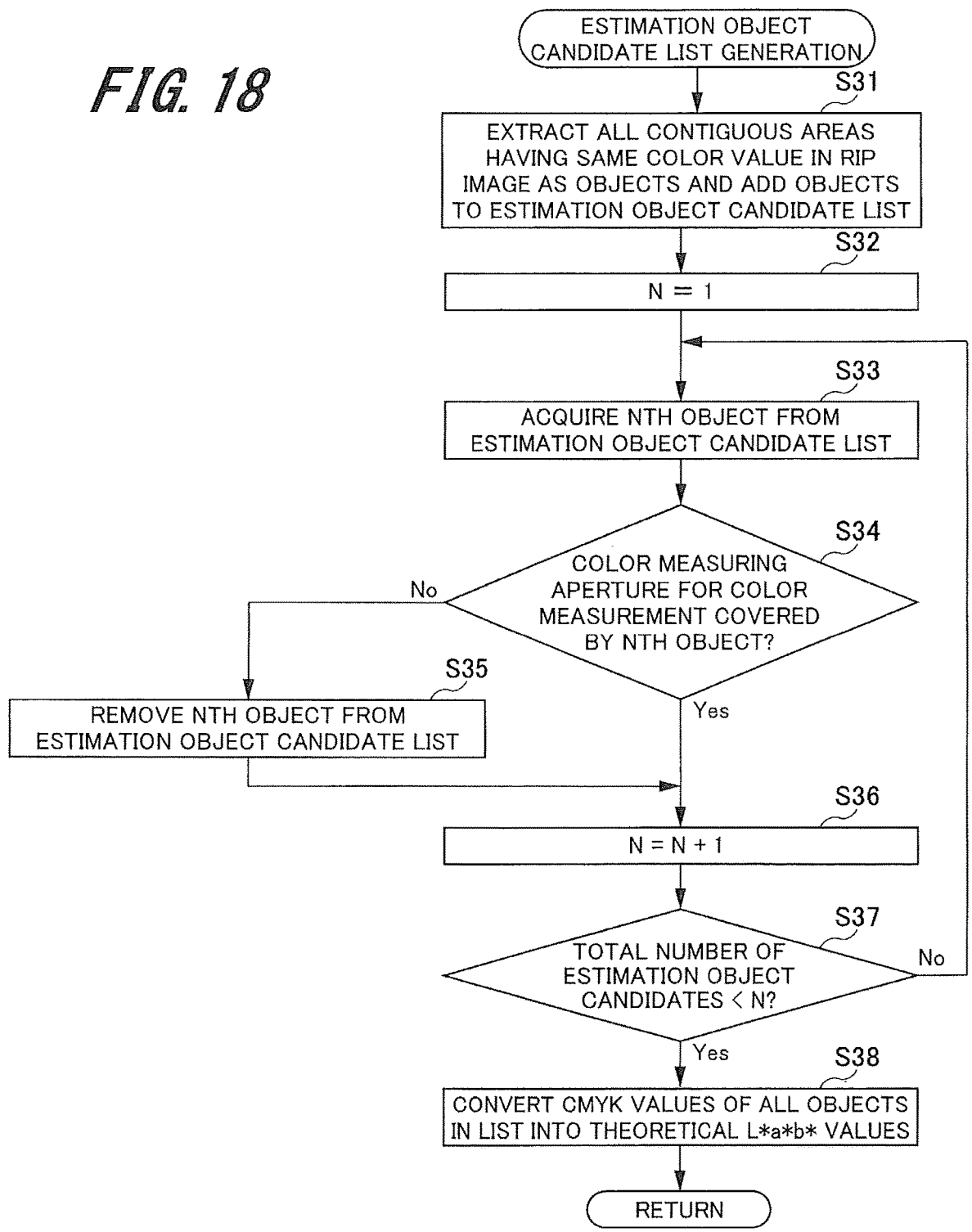
FIG. 18 is a flowchart illustrating a flow of an estimation object candidate list generation process in FIG. 16.

FIG. 18 is a flowchart illustrating a flow of the estimation object candidate list generation process at step S21 in FIG. 16.

The estimation object candidate list generator 54*a* extracts all contiguous areas having the same color value (such as the CMYK value) in RIP image 3D as objects and adds the objects as estimation object candidates to the estimation object candidate list (S31). The extracted object is assigned a unique number.

The estimation object candidate list generator 54*a* sets counter variable N to 1 (N=1) (S32). The estimation object candidate list generator 54*a* acquires the nth (first) object from the estimation object candidate list (S33).

The estimation object candidate list generator 54*a* determines whether the nth (first) object covers the color measuring aperture 5*a* of the color measuring instrument 5 (S34). If the nth (first) object does not cover the color measuring aperture 5*a* of the color measuring instrument 5 (No at S34), the estimation object candidate list generator 54*a* removes the nth object from the estimation object candidate list (S35) and proceeds to the process at step S36. If the nth object covers the color measuring aperture 5*a* of the color measuring instrument 5 (Yes at S34), the estimation object candidate list generator 54*a* proceeds to the process at step S36.

Counter variable N is incremented by 1 (N=N+1) (S36) after the process at step S35 or if step S34 results in Yes. The estimation object candidate list generator 54*a* determines whether the total number of objects (estimation object candidates) added to the estimation object candidate list is smaller than counter variable N (S37). If counter variable N is smaller than or equal to the total number of objects in the list (No at S37), the estimation object candidate list generator 54*a* proceeds to the process at step S33.

If counter variable N is greater than the total number of objects in the list (Yes at S37), the estimation object candidate list generator 54*a* converts CMYK values of all the objects in the estimation object candidate list into theoretical L*a*b* values based on the correspondence relationship between the CMYK value and the L*a*b* value defined in the color profile (S38).

After the process at step S38, the estimation object candidate list generator 54*a* proceeds to step S22 in FIG. 16.

The present embodiment excels the related art in that the color measurement value of a color measurement target can be estimated only by performing color measurement on other objects existing in the same printed matter through the use of the color measuring instrument 5 without separately calculating a correction coefficient. Namely, the embodiment estimates the color measurement value of a color verification target object (such as a specific color object) smaller than the color measuring aperture of the color measuring instrument 5 from color measurement values of the other objects in the printed matter.

The above-mentioned first embodiment can perform the color verification on color verification target objects without separately calculating a correction coefficient even when a color verification target object (such as the specific color object 1a) is smaller than the caliber of the color measuring aperture 5a of the color measuring instrument 5 (the specific color object 1a does not cover the color measuring aperture 5a).

The first embodiment eliminates the need to provide a trim area for placing a color patch to confirm the color shade of a specific color for the purpose of color verification when the image forming apparatus 30 (digital printer) prints the specific color object 1a smaller than the caliber of the color measuring aperture 5a. It is therefore possible to prevent the wasteful use of paper or reduce a labor of cutting the paper.

Moreover, the first embodiment eliminates the need for a trim area and therefore increases a printable size, making it possible to generate a printed matter using paper having a size incapable of printing on related-art digital printers.

2. Second Embodiment

The second embodiment enables color verification even when theoretical $L^*a^*b^*$ values of a color verification target object are not included in a space of the $L^*a^*b^*$ coordinate system configured by theoretical $L^*a^*b^*$ values of four estimation object candidates optionally selected from the estimation object candidate list.

Color Verification Process

Figure 19:
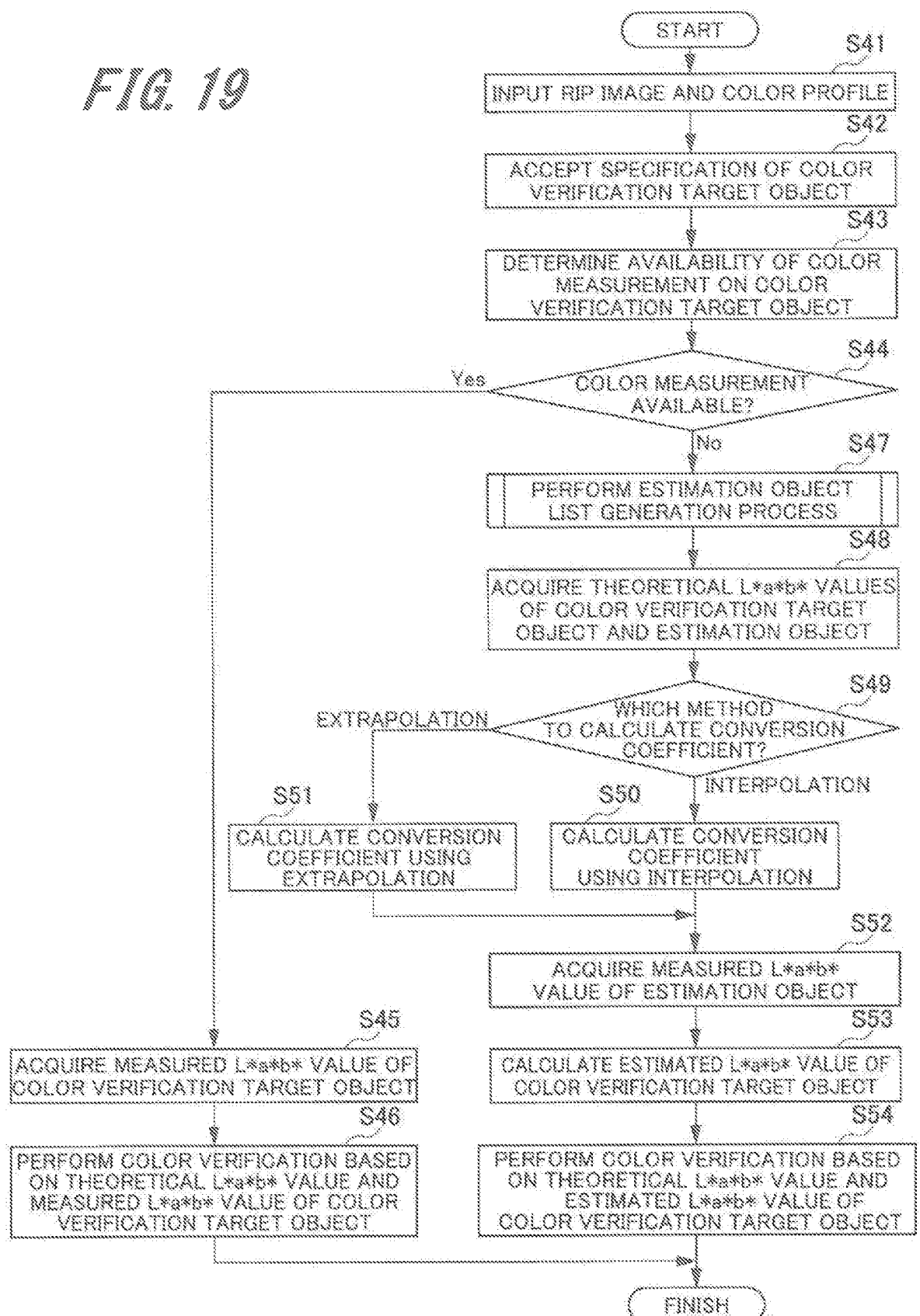
FIG. 19 is a flowchart illustrating a flow of a color verification process performed by the color verification system according to a second embodiment of the present invention.

With reference to FIG. 19, the description below explains an example flow of the color verification process performed by the color verification system 10 according to the second embodiment.

FIG. 19 is a flowchart illustrating a flow of the color verification process performed by the color verification system 10 according to the second embodiment. The process at steps S41 through S46, S48, and S51 through S54 of the flowchart is equal to the process at steps S1 through S6, S8, and S9 through S12 of the flowchart in FIG. 9 and a detailed description is omitted.

The controller 41 of the PC terminal 40 accepts input of RIP image 3D and the color profile from the image processing apparatus 20 (S41) and accepts the specification of a color verification target object in RIP image 3D (S42). The controller 41 determines whether the color measurement is available to the color verification target object (such as the specific color object 1a) (S43). If the color measuring instrument 5 can perform the color measurement on the color verification target object (Yes at S43), the process acquires a measured $L^*a^*b^*$ value of the color verification target object (S45). The controller 41 perform the color verification on the color verification target object based on a theoretical $L^*a^*b^*$ value and the measured $L^*a^*b^*$ value of the color verification target object (S46).

If the color measuring instrument 5 cannot perform the color measurement on the color verification target object (No at S44), the controller 41 generates an estimation object list (S47). A conversion coefficient calculation method to be described later depends on the generated estimation object list. An estimation object list generation process at step S47 will be described in detail later with reference to FIG. 20.

Based on the color profile, the controller 41 acquires theoretical $L^*a^*b^*$ values of the color verification target object and an estimation object (S48). The controller 41 determines a conversion coefficient calculation method (S49).

The interpolation may be used as the conversion coefficient calculation method (interpolation at S49). In this case, the controller 41 performs the interpolation from the theoretical $L^*a^*b^*$ value of the estimation object as expressed in equation (1) described above to calculate interpolation coefficients h, i, j, and k needed to find theoretical $L^*a^*b^*$ values of an object targeted at the color conversion and uses the interpolation coefficients as conversion coefficients (S50).

The extrapolation may be used as the conversion coefficient calculation method (extrapolation at S49). In this case, the controller 41 performs the extrapolation from the theoretical $L^*a^*b^*$ value of the estimation object as expressed in equation (3) below to calculate extrapolation coefficients h, i, j, and k needed to find theoretical $L^*a^*b^*$ values of an object targeted at the color conversion and uses the extrapolation coefficients as conversion coefficients (S51).

$$L^*_0 = hL^*_1 + iL^*_2 + jL^*_3 + kL^*_4$$

$$a^*_0 = ha^*_1 + ia^*_2 + ja^*_3 + ka^*_4$$

$$b^*_0 = hb^*_1 + ib^*_2 + jb^*_3 + kb^*_4 \quad (3)$$

After terminating the process at step S50 or S51, the controller 41 acquires a measured $L^*a^*b^*$ value of the estimation object (S52) and calculates an estimated $L^*a^*b^*$ value of the color verification target object based on the measured $L^*a^*b^*$ value and the conversion coefficient (S53).

The color verifier 59 performs the color verification based on the theoretical $L^*a^*b^*$ value (target value) and the estimated $L^*a^*b^*$ value of the color verification target object (S54) and displays a color verification result on the displayer 45. After terminating this process, the color verification system 10 terminates the color verification process.

Estimation Object List Generation Process

The description below explains an example flow of the estimation object list generation process at step S47 in FIG. 19. The estimation object candidate list may not include four objects containing $L^*a^*b^*$ values of a color verification target object in space SP configured by $L^*a^*b^*$ values of four objects Obj1 through Obj4 (FIG. 17) in the $L^*a^*b^*$ coordinate system. In this case, supposing that an extrapolation coefficient is found as a conversion coefficient, the process selects four objects out of those registered to the estimation object candidate list in ascending order of color differences ΔE from the color verification target object in the $L^*a^*b^*$ color system and adds the selected objects to the estimation object list.

Figure 20:
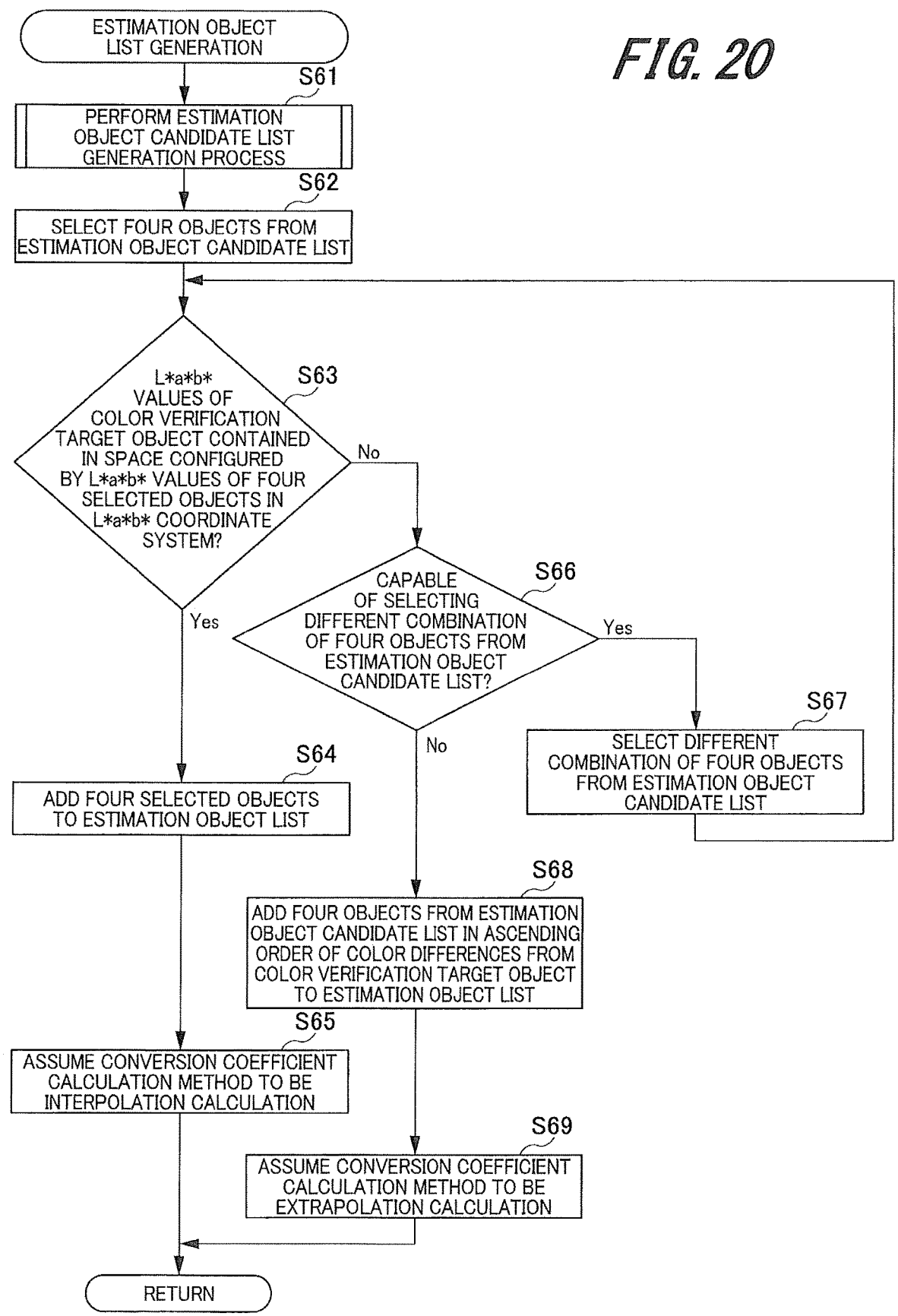
FIG. 20 is a flowchart illustrating a flow of an estimation object list generation process in FIG. 19.

FIG. 20 is a flowchart illustrating a flow of the estimation object list generation process at step S47 in FIG. 19. The process at steps S61 through S64 and S67 of the flowchart is equal to the process at steps S21 through S24 and S25 of the flowchart in FIG. 16 and a detailed description is omitted.

The estimation object list generator 54 generates an estimation object candidate list (S61). The estimation object candidate list generation process is already described in detail with reference to FIG. 18.

The estimation object list generator 54 optionally selects four objects from the estimation object candidate list (S62). The estimation object list generator 54 determines whether the space (see FIG. 17) configured by the $L^*a^*b^*$ values of four selected objects Obj1 through Obj4 in the $L^*a^*b^*$ coordinate system contains $L^*a^*b^*$ values of the color verification target object (specific color object 1a) (S63).

If space SP configured by the $L^*a^*b^*$ values of four selected objects Obj1 through Obj4 contains $L^*a^*b^*$ values of the color verification target object (Yes at S63), the estimation object list generator 54 adds four selected objects Obj1 through Obj4 to the estimation object list (S64). The estimation object list generator 54 identifies the conversion coefficient calculation method as the interpolation calculation and returns to the process at step S48 in FIG. 19.

If space SP configured by the L*a*b* values of four selected objects Obj1 through Obj4 does not contain L*a*b* values of the color verification target object (No at S63), the estimation object list generator 54 determines whether a different combination of four objects can be selected from the estimation object candidate list (S66). Namely, this determines whether four unspecified objects can form a new combination.

If it is determined that a different combination of four objects can be selected (Yes at S66), the estimation object list generator 54 selects a different combination of four objects from the estimation object candidate list (S67) and proceeds to the process at step S63. If space SP configured by the L*a*b* values of four objects Obj1 through Obj4 does not contain L*a*b* values of the color verification target object, the process at steps S63, S66, and S67 is repeated as long as four objects can be selected in different combinations.

If it is determined that a different combination of four objects cannot be selected (No at S66), the estimation object list generator 54 selects four objects from the estimation object candidate list in ascending order of color differences ΔE from the color verification target object and adds the selected objects to the estimation object list (S68). The estimation object list generator 54 identifies the conversion coefficient calculation method as the extrapolation calculation and returns to the process at step S48 in FIG. 19.

At step S51 in FIG. 19, the conversion coefficient calculator 56 calculates an extrapolation coefficient to find a theoretical L*a*b* value of a color verification target object based on the extrapolation from theoretical L*a*b* values of four estimation objects having small color differences from the color verification target object and identifies this extrapolation coefficient as a conversion coefficient.

If space SP configured by the L*a*b* values of four objects Obj1 through Obj4 does not contain L*a*b* values of the color verification target object, the above-mentioned second embodiment selects four objects from the estimation object candidate list in ascending order of color differences ΔE from the color verification target object. The conversion coefficient calculation method is identified as the extrapolation calculation using four objects selected in ascending order of color differences ΔE from the color verification target object. It is therefore possible to calculate an estimated L*a*b* value of the color verification target object regardless of whether space SP configured by the L*a*b* values of four objects Obj1 through Obj4 contains L*a*b* values of the color verification target object.

3. Modifications

The above-mentioned embodiments have described the example of allowing the color verification target object specifier 52 to accept the specification of a color verification target object from the user but are not limited to this example. A specific object such as a specific color object may be automatically extracted as a color verification target object from the RIP image without allowing the user to specify the color verification target object. Data of the RIP image contains a tag bit plane for each of the reference colors (such as CMYK) generated. The tag bit plane for each reference color contains information such as a color value of each pixel and a tag bit corresponding to the type of object (text, graphics, or image) in each area of the RIP image. Similarly, data of the RIP image is provided with information (such as flag information) representing the specific color object, thereby enabling the color verification target object specifier 52 to extract the specific color object as a color verification target from the RIP image.

Although embodiments of the present invention have been described and illustrated in detail, the present invention is not limited to the above-mentioned embodiments. It is further understood by those skilled in the art that various applications and modifications may be made in the present invention without departing from the spirit and scope thereof described in the appended claims.

For example, the above-mentioned embodiments describe in detail and specifically configurations of the apparatuses and the system in order to explain the present invention for simplicity, but are not limited to an entity including all the constituent elements that have been described. The configuration of an embodiment can be partially replaced by the constituent elements of another embodiment. The constituent elements of an embodiment can be added to the configuration of another embodiment. The configuration of each embodiment can be partially subject to addition, deletion, or replacement of other constituent elements.

All or part of the above-mentioned constituent elements, functions, and processors or the like may be implemented as hardware by designing integrated circuits, for example. The constituent elements of the controller included in the PC terminal according to the above-mentioned embodiments may be mounted on any hardware component if the hardware components can exchange information with each other via a network. A process performed by a given processor may be implemented by one hardware component or may be implemented by a plurality of hardware components as distributed processing.

REFERENCE SIGNS LIST

5 . . . color measuring instrument, 5a . . . color measuring aperture, 20 . . . image processing apparatus, 30 . . . image forming apparatus, 40 . . . PC terminal, 41 . . . controller, 42 . . . CPU, 51 . . . data input processor, 52 . . . color verification target object specifier, 53 . . . color measurement availability determiner, 54 . . . estimation object list generator, 54a . . . estimation object candidate list generator, 55 . . . theoretical L*a*b* value acquirer, 56 . . . conversion coefficient calculator, 57 . . . measured L*a*b* value acquirer, 58 . . . estimated L*a*b* value calculator, 59 . . . color verifier, CP . . . color profile, 60 . . . color verification job selection screen-view, 70 . . . color verification target object selection screen-view, 80 . . . color verification target object color measurement instruction screen-view, 90 . . . color verification result display screen-view

What is claimed is:

1. A color verification apparatus comprising a hardware processor configured to:
   accept input of a RIP image in a device-dependent color system and a color profile on condition that the RIP image is generated by performing rasterization and color conversion on an original document image including a color verification target object for image formation in an image forming apparatus and the color profile defines correspondence relationship between a color space based on a device-dependent color system for the RIP image and a color space based on a device-independent color system;
   compare the color verification target object with a color measuring aperture of a color measuring instrument and determine whether the color measuring instrument can perform color measurement on the color verification target object, based on a comparison result indicative whether the color verification target object completely covers a color measuring aperture of the color measuring instrument;

extract an estimation object and generate a list on condition that the estimation object is comparable to an object belonging to objects included in the RIP image, maintains uniform device-dependent color values of constituent pixels, and completely covers a color measuring aperture of the color measuring instrument;

acquire a device-dependent color value of each pixel in the RIP image, use the color profile to convert the device-dependent color value into a device-independent color value, and acquire the device-independent color value as a theoretical color value;

calculate a conversion coefficient in order to derive a theoretical color value of the color verification target object from a theoretical color value of the estimation object acquired by the theoretical color value acquirer;

measure the estimation object in a printed matter including the RIP image formed by the image forming apparatus by using the color measuring instrument and acquire a measured color value of the estimation object;

calculate an estimated color value of the color verification target object from a measured color value of the estimation object and the conversion coefficient; and perform color verification on the color verification target object in the printed matter based on an estimated color value of the color verification target object calculated by the estimated color value calculator and a theoretical color value of the color verification target object acquired by the theoretical color value acquirer when the color measurement availability determiner produces a determination result indicative that color measurement is unavailable to the color verification target object.

2. The color verification apparatus according to claim 1, wherein the hardware processor is further configured to:

extract an estimation object candidate and generate a list on condition that the estimation object candidate is comparable to an object belonging to objects included in the RIP image, maintains uniform color values, and completely covers a color measuring aperture of a color measuring instrument, wherein the hardware processor determines whether a theoretical color value of the color verification target object is included in a space based on a device-independent color system including theoretical color values of four estimation object candidates selected from an estimation object candidate list generated by the hardware processor and, when a theoretical color value of the color verification target object is included in a space based on the device-independent color system including theoretical color values of the four estimation object candidates, extracts the four estimation object candidates as the estimation objects, and generates the estimation object list; and wherein the hardware processor calculates an interpolation coefficient in order to find a theoretical color value of the color verification target object from theoretical color values of the four estimation objects by using interpolation and identifies the interpolation coefficient as the conversion coefficient.

3. The color verification apparatus according to claim 2, wherein, when the estimation object is not extracted from the estimation object candidate list and the estimation object list is not generated, the hardware processor performs a process that selects four estimation object candidates from the estimation object candidate list in ascending order of color differences from the color verification target object; and wherein the hardware processor calculates an extrapolation coefficient in order to find a theoretical color value of the color verification target object from theoretical color values of the four estimation objects having small color differences from the color verification target object by using extrapolation and identifies the extrapolation coefficient as the conversion coefficient.

4. The color verification apparatus according to claim 1, wherein the device-dependent color system corresponds to a CMYK color system and the device-independent color system corresponds to an L*a*b* color system.

5. The color verification apparatus according to claim 1, wherein the hardware processor is further configured to:

accept specification of a color verification target object out of objects included in the RIP image accepted by the hardware processor.

6. A color verification system comprising:

a color measuring instrument having a color measuring aperture formed; and a color verification apparatus that performs color verification on a color verification target object based on a color measurement result from the color measuring instrument, wherein the color verification apparatus includes:

an input processor that accepts input of a RIP image in a device-dependent color system and a color profile on condition that the RIP image is generated by performing rasterization and color conversion on an original document image including a color verification target object for image formation in an image forming apparatus and the color profile defines correspondence relationship between a color space based on a device-dependent color system for the RIP image and a color space based on a device-independent color system;

a color measurement availability determiner that compares the color verification target object with a color measuring aperture of the color measuring instrument and determines whether the color measuring instrument can perform color measurement on the color verification target object, based on a comparison result indicative whether the color verification target object completely covers a color measuring aperture of the color measuring instrument;

an estimation object list generator that extracts an estimation object and generates a list on condition that the estimation object is comparable to an object belonging to objects included in the RIP image, maintains uniform device-dependent color values of constituent pixels, and completely covers a color measuring aperture of the color measuring instrument;

a theoretical color value acquirer that acquires a device-dependent color value of each pixel in the RIP image, uses the color profile to convert the device-dependent color value into a device-independent color value, and acquires the device-independent color value as a theoretical color value;

a conversion coefficient calculator that calculates a conversion coefficient in order to derive a theoretical color value of the color verification target object from a theoretical color value of the estimation object acquired by the theoretical color value acquirer;

a measured color value acquirer that measures the estimation object in a printed matter including the RIP image formed by the image forming apparatus by using the color measuring instrument and acquires a measured color value of the estimation object;

an estimated color value calculator that calculates an estimated color value of the color verification target object from a measured color value of the estimation object and the conversion coefficient; and a color verifier that performs color verification on the color verification target object in the printed matter based on an estimated color value of the color verification target object calculated by the estimated color value calculator and a theoretical color value of the color verification target object acquired by the theoretical color value acquirer when the color measurement availability determiner produces a determination result indicative that color measurement is unavailable to the color verification target object.

7. A nontransitory computer-readable storage medium encoded with a program performing the following steps:

an input processing procedure that accepts input of a RIP image in a device-dependent color system and a color profile on condition that the RIP image is generated by performing rasterization and color conversion on an original document image including a color verification target object for image formation in an image forming apparatus and the color profile defines correspondence relationship between a color space based on a device-dependent color system for the RIP image and a color space based on a device-independent color system;

a color measurement availability determination procedure that compares the color verification target object with a color measuring aperture of a color measuring instrument and determines whether the color measuring instrument can perform color measurement on the color verification target object, based on a comparison result indicative whether the color verification target object completely covers a color measuring aperture of the color measuring instrument;

an estimation object list generation procedure that extracts an estimation object and generates a list on condition that the estimation object is comparable to an object belonging to objects included in the RIP image, maintains uniform device-dependent color values of constituent pixels, and completely covers a color measuring aperture of the color measuring instrument;

a theoretical color value acquisition procedure that acquires a device-dependent color value of each pixel in the RIP image, uses the color profile to convert the device-dependent color value into a device-independent color value, and acquires the device-independent color value as a theoretical color value;

a conversion coefficient calculation procedure that calculates a conversion coefficient in order to derive a theoretical color value of the color verification target object from a theoretical color value of the estimation object acquired by the theoretical color value acquisition procedure;

a measured color value acquisition procedure that measures the estimation object in a printed matter including the RIP image formed by the image forming apparatus by using the color measuring instrument and acquires a measured color value of the estimation object;

an estimated color value calculation procedure that calculates an estimated color value of the color verification target object from a measured color value of the estimation object and the conversion coefficient; and a color verification procedure that performs color verification on the color verification target object in the printed matter based on an estimated color value of the color verification target object calculated by the estimated color value calculation procedure and a theoretical color value of the color verification target object acquired by the theoretical color value acquisition procedure when the color measurement availability determination procedure produces a determination result indicative that color measurement is unavailable to the color verification target object.

8. A color verification apparatus comprising a hardware processor configured to:

accept input of an original document including a color verification target object;

determine whether the color verification target object completely covers a color measuring aperture of a color measuring instrument;

extract, among from objects included in the original document, an object that has uniform color values and that completely covers the color measuring aperture of the color measuring instrument, as an estimation object usable for estimating a color value of the color verification target object;

measure the estimation object in a printed matter on which the original document has been formed by an image forming apparatus, using the color measuring instrument, and acquire a measured color value of the estimation object; and perform color verification on the color verification target object in the printed matter based on the measured color value of the estimation object, when the color verification target object does not completely cover the color measuring aperture of the color measuring instrument.

9. The color verification apparatus according to claim 8, wherein the hardware processor extracts a plurality of estimation objects usable for estimating a color value of the color verification target object.

10. The color verification apparatus according to claim 9, wherein the color verification target object is contained in a color space surrounded by the extracted plurality of estimation objects.

11. The color verification apparatus according to claim 10, wherein the color verification of the color verification target object is performed after interpolation of the measured color values of the extracted plurality of estimation objects.

12. The color verification apparatus according to claim 11, wherein the hardware processor performs the color verification based upon the measured color value of the color verification target object, when the color verification target object completely covers the color measuring aperture of the measuring instrument.

13. The color verification apparatus according to claim 9, wherein the hardware processor performs the color verification based upon the measured color value of the color verification target object, when the color verification target object completely covers the color measuring aperture of the measuring instrument.

14. The color verification apparatus according to claim 10, wherein the hardware processor performs the color verification based upon the measured color value of the color verification target object, when the color verification target object completely covers the color measuring aperture of the measuring instrument.

15. The color verification apparatus according to claim 9, wherein the color verification target object is contained outside of a color space surrounded by the extracted plurality of estimation objects.

16. The color verification apparatus according to claim 15, wherein the color verification of the color verification target object is performed after extrapolation of the measured color values of the extracted plurality of estimation objects.

17. The color verification apparatus according to claim 16, wherein the hardware processor performs the color verification based upon the measured color value of the color verification target object, when the color verification target object completely covers the color measuring aperture of the measuring instrument.

18. The color verification apparatus according to claim 15, wherein the hardware processor performs the color verification based upon the measured color value of the color verification target object, when the color verification target object completely covers the color measuring aperture of the measuring instrument.

19. The color verification apparatus according to claim 8, wherein the hardware processor performs the color verification based upon the measured color value of the color verification target object, when the color verification target object completely covers the color measuring aperture of the measuring instrument.

* * * * *